US007864241B2

(12) United States Patent
Iwasaki

(10) Patent No.: US 7,864,241 B2
(45) Date of Patent: Jan. 4, 2011

(54) LENS BARREL, CAMERA AND MOBILE INFORMATION TERMINAL

(75) Inventor: Tetsuya Iwasaki, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 286 days.

(21) Appl. No.: 11/913,266

(22) PCT Filed: Oct. 17, 2006

(86) PCT No.: PCT/JP2006/320999

§ 371 (c)(1),
(2), (4) Date: Apr. 16, 2008

(87) PCT Pub. No.: WO2007/046521

PCT Pub. Date: Apr. 26, 2007

(65) Prior Publication Data

US 2009/0066829 A1    Mar. 12, 2009

(30) Foreign Application Priority Data

Oct. 18, 2005    (JP) .............................. 2005-303744

(51) Int. Cl.
*H04N 5/225* (2006.01)
*G02B 7/16* (2006.01)
*G02B 15/00* (2006.01)
*G03B 17/00* (2006.01)
*G03B 17/14* (2006.01)

(52) U.S. Cl. ........................ 348/360; 348/357; 348/361; 359/675; 359/826; 396/73; 396/74

(58) Field of Classification Search ................. 348/335, 348/345, 357, 360, 361; 396/72–75; 359/672, 359/675, 811, 819, 822, 823, 826

See application file for complete search history.

(56) References Cited

U.S. PATENT DOCUMENTS

| 6,853,499 | B2 | 2/2005 | Iwasaki |
| 6,963,455 | B2* | 11/2005 | Nomura et al. ............. 359/694 |
| 7,580,623 | B2* | 8/2009 | Nuno et al. .................. 396/73 |
| 2006/0056079 | A1* | 3/2006 | Ishizuka et al. ............. 359/811 |

FOREIGN PATENT DOCUMENTS

JP    11-174305    7/1999

(Continued)

OTHER PUBLICATIONS

U.S. Appl. No. 11/913,266, filed Oct. 31, 2007, Iwasaki.

*Primary Examiner*—Sinh Tran
*Assistant Examiner*—Mark Monk
(74) *Attorney, Agent, or Firm*—Oblon, Spivak, McClelland, Maier & Neustadt, L.L.P.

(57) ABSTRACT

A lens barrel includes: a lens frame retaining at least one portion of the plurality of lens groups; a first lens cylinder supporting the lens frame inside thereof and including a plurality of cam followers on an outer circumferential section thereof; and a second lens cylinder including a mutually parallel plurality of cam grooves in an inner circumferential section thereof and storing the first lens cylinder therein in the collapsed state, the plurality of cam grooves are engaged with the plurality of cam followers and configured to advance and retire the first lens cylinder in a direction of an optical axis by a relative rotation of the first lens cylinder, the plurality of cam grooves have a first cam grooves and a second cam grooves, the plurality of cam followers have a first cam follower and a second cam follower, the first cam follower and the second cam follower are engaged with the first cam grooves and the second cam grooves, respectively, and the first cam follower and the second cam follower are disposed in positions mutually different relative to the direction of the optical axis.

25 Claims, 34 Drawing Sheets

FOREIGN PATENT DOCUMENTS

| | | |
|---|---|---|
| JP | 2000-147351 | 5/2000 |
| JP | 2001-100083 | 4/2001 |
| JP | 2003-098417 | 4/2003 |
| JP | 2003-279827 | 10/2003 |
| JP | 2003-315861 | 11/2003 |
| JP | 2003-337276 | 11/2003 |
| JP | 2004-053820 | 2/2004 |
| JP | 2004-109299 | 4/2004 |
| JP | 2004-109934 | 4/2004 |
| JP | 2004-144790 | 5/2004 |
| JP | 2004-258635 | 9/2004 |
| JP | 2004-361921 | 12/2004 |
| JP | 2005-055588 | 3/2005 |
| JP | 2005-055664 | 3/2005 |
| JP | 2005-077616 | 3/2005 |
| JP | 2005-173442 | 6/2005 |
| JP | 2005-221889 | 8/2005 |
| JP | 2006-227214 | 8/2006 |
| JP | 2006-243549 | 9/2006 |
| JP | 2006-243569 | 9/2006 |
| JP | 2006-243589 | 9/2006 |
| JP | 2006-243605 | 9/2006 |
| JP | 2006-250963 | 9/2006 |
| JP | 2006-251668 | 9/2006 |
| JP | 2006-259395 | 9/2006 |
| JP | 2007-114323 | 5/2007 |

* cited by examiner

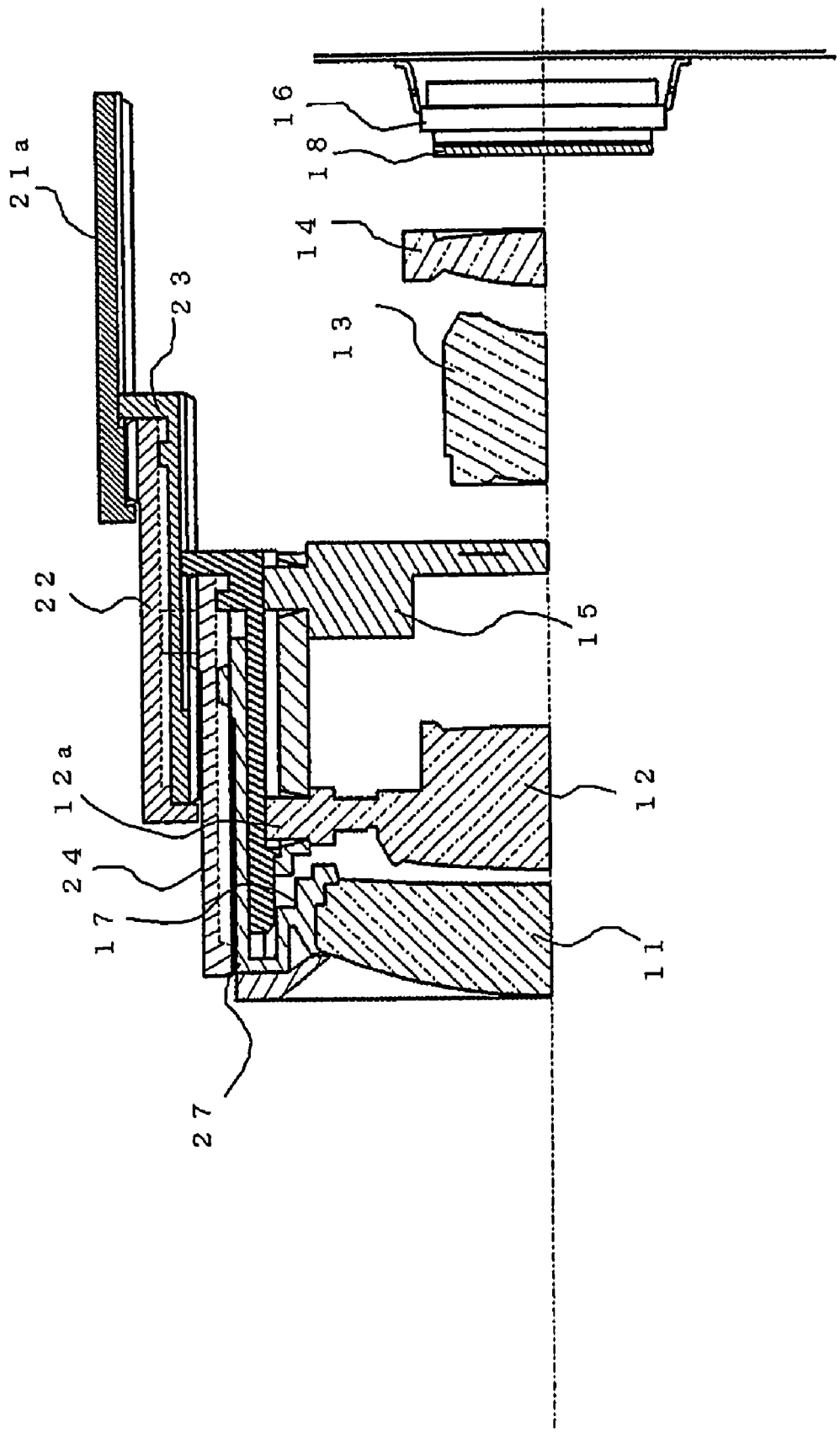

LENS BARREL, CAMERA AND MOBILE INFORMATION TERMINAL

TECHNICAL FIELD

The present invention relates to a lens barrel which establishes a collapsed state in which at least a part of a plurality of lens groups is collapsed to store the lens groups therein, and establishes a photographing state by moving at least a part of the plurality of lens groups toward a side of an object. More particularly, the invention relates to a lens barrel suitable for a photographing lens used for a camera such as a so-called digital camera, and to a camera and a mobile information terminal using the lens barrel.

BACKGROUND ART

A so-called digital camera, for example, which images an image of an object to be photographed with a solid-state image pick-up device such as a CCD (Charge-Coupled Device) image pick-up device or the like, acquires image data of a static image (still image) or a motion image (movie image) of the photographic object, and digitally stores the acquired image data into a recording medium such as a non-volatile semiconductor memory medium or the like, has been generalized in recent years.

A lens barrel in an ordinary digital camera typically has a zooming mechanism which utilizes cam grooves structured by concaved grooves or penetrated grooves, and cam followers normally structured by pin-like protruded portions. The cam grooves are formed on a cam frame as a rotary frame, and the cam followers are protrudedly provided on an outer circumferential part of a lens frame which retains at least a part of a plurality of lens groups. Thereby, a type of structure is established in which the lens frame is moved in a direction of an optical axis through the cam followers which engage with and follow the cam grooves by rotation of the cam frame having the cam grooves.

Problems caused by such a type of structure include detachment of the cam followers from the cam grooves, deterioration of optical performance caused by a backlash or play between the cam followers and the cam grooves, generation of leakage of light, and so on. In order to remedy the problems, a type of structure which performs a linear screw feed drive by a helicoid drive of a screw feed type having a constant inclination using so-called hericoids as a cam mechanism, may be considered.

On the other hand, a first lens group nearest to a side of the object in the plurality of lens groups in the ordinary digital camera is generally required to move nonlinearly, so that in many cases, the first lens group is required to be compensated and moved by a separate cam mechanism after a linear drive is done. Therefore, since a mechanism of the digital camera becomes complicated when the helicoid drive is employed, the helicoid drive is often not employed in digital cameras.

In consideration of the above circumstance, Japanese Patent Publication No. 2004-109299 discloses a structure in which helicoids as cam grooves having two parts of a part which establishes a linear movement and a part which establishes a rotary movement are formed. Hence, the structure disclosed in JP2004-109299A makes the first lens group possible to be driven nonlinearly while the helicoid drive is employed.

In the structure disclosed in JP2004-109299A, however, the helicoids having constant displacement relative to the optical axis direction are utilized to attain engagement with the cam followers in the part which establishes the rotary movement without any movement in the optical axis direction. Thus, the helicoids as the cam grooves are formed on same positions relative to the optical axis direction, i.e. formed along a plane to which the optical axis crosses vertically. In such a case, when attempting to increase the number of the helicoids or increase an angle of rotation, the helicoids as the cam grooves of the part establishing the rotary movement without moving in the optical axis direction are located on same circumferential positions along the same plane to which the optical axis crosses vertically, and hence, the helicoids are overlapped with respect to one another. Therefore, there is a problem that the number of the helicoids is restricted when attempting to increase the angle of rotation, and thereby, further problems on the backlash, inclination of the lens barrel and so on arise due to unstable support of the lens frame. On the other hand, when the number of the helicoids as the cam grooves is increased, the angle of rotation cannot be increased, and thus, a degree of freedom for performing optical control is limited.

DISCLOSURE OF THE INVENTION

At least one objective of the present invention is to provide a lens barrel, a camera and a mobile information terminal capable of using the practically enough number of cam followers and cam grooves while an angle of rotation attained by those cam followers and cam grooves is also possible to be increased. The lens barrel, the camera and the mobile information terminal according to the present invention are also possible to obtain a high degree of freedom in optical control and to achieve a stable drive.

(1) To achieve these and other advantages and in accordance with the purpose of the invention, as embodied and broadly described herein, the invention provides a lens barrel according to a first aspect, in which at least one portion of a plurality of lens groups is collapsed to store the plurality of lens groups in a collapsed state and at least one portion of the plurality of lens groups is moved toward an object in a photographing state, the lens barrel comprising: a lens frame retaining at least one portion of the plurality of lens groups; a first lens cylinder supporting the lens frame inside thereof and including a plurality of cam followers on an outer circumferential section thereof; and a second lens cylinder including a mutually parallel plurality of cam grooves in an inner circumferential section thereof and storing the first lens cylinder therein in the collapsed state, the plurality of cam grooves being engaged with the plurality of cam followers and configured to advance and retire the first lens cylinder in a direction of an optical axis by a relative rotation of the first lens cylinder, the plurality of cam grooves having a first cam groove and a second cam groove, the plurality of cam followers having a first cam follower and a second cam follower, the first cam follower and the second cam follower being engaged with the first cam groove and the second cam groove, respectively, and the first cam follower and the second cam follower being disposed in positions mutually different relative to the direction of the optical axis.

(2) To achieve these and other advantages and in accordance with the purpose of the invention, as embodied and broadly described herein, the invention provides a lens barrel according to a second aspect, in which at least one portion of a plurality of lens groups is collapsed to store the plurality of lens groups in a collapsed state and at least one portion of the plurality of lens groups is moved toward an object in a photographing state, the lens barrel comprising: a lens frame retaining at least one portion of the plurality of lens groups; a first lens cylinder supporting the lens frame inside thereof and including a plurality of cam followers on an outer circumferential section thereof; and a second lens cylinder including a mutually parallel plurality of cam grooves in an inner circumferential section thereof and storing the first lens cylinder therein in the collapsed state, the plurality of cam grooves being engaged with the plurality of cam followers and configured to advance and retire the first lens cylinder in a direction of an optical axis by a relative rotation of the first lens cylinder, the plurality of cam grooves having a first cam groove and a second cam groove, the plurality of cam followers having a first cam follower and a second cam follower, the first cam follower and the second cam follower being engaged with the first cam groove and the second cam groove, respectively, and the first cam groove and the second cam groove being disposed to be biased and in parallel with each other in positions mutually different relative to the direction of the optical axis.

(3) In accordance with an embodiment of the invention, the first cam groove and the second cam groove engaged with the first cam follower and the second cam follower, respectively, intersect to each other.

(4) In accordance with an embodiment of the invention, each of the first cam groove and the second cam groove has a cam-configuration including a configuration: inclined to move the first lens cylinder substantially linearly from a collapsed position to a maximally extended position of the first lens cylinder; and extending in a circumferential direction of the second lens cylinder along a plane to which the optical axis crosses substantially vertically to allow only the rotation of the first lens cylinder and restrict the first lens cylinder to advance and retire in the direction of the optical axis at the maximally extended position in a maximally extended state to the photographing state, and the first lens cylinder is configured to be moved to the maximally extended position before the lens frame supported by the first lens cylinder reaches to the photographing state from the collapsed state.

(5) In accordance with an embodiment of the invention, each of the first cam follower and the second cam follower comprises: a pair of inclined sections inclined relative to the direction of the optical axis and faces mutually in parallel; and a pair of vertical surface sections forming the plane to which the optical axis crosses substantially vertically and faces mutually in parallel, wherein the inclined sections slidingly contact with cam surfaces of the first cam groove and the second cam groove in ranges of the cam surfaces in which the first lens cylinder is moved to the direction of the optical axis, respectively, and the vertical surface sections slidingly contact with cam surfaces of the first cam groove and the second cam groove in ranges of the cam surfaces in which the first lens cylinder is rotated in the plane to which the optical axis crosses substantially vertically, respectively.

(6) In accordance with an embodiment of the invention, three sets or more of the cam grooves and the cam followers are provided, and at least the three sets of the cam grooves and the cam followers are engaged mutually at least in a range in which the first lens cylinder is rotated in the plane to which the optical axis crosses substantially vertically without advancing or retiring along the optical axis.

(7) In accordance with an embodiment of the invention, all of the cam followers of the first lens cylinder engage with all of the cam grooves of the second lens cylinder in a neighborhood of a boundary part between a range in which the first lens cylinder is driven in the direction of the optical axis and a range in which the first lens cylinder is rotated in the plane to which the optical axis crosses substantially vertically without advancing or retiring along the optical axis.

(8) In accordance with an embodiment of the invention, the second lens cylinder further comprises a cutout portion allowing at least one portion of a lens frame retaining other at least one portion of the plurality of lens groups to pass therethrough to locate the at least one portion of the lens frame retaining other at least one portion of the plurality of lens groups substantially outside of the second lens cylinder to establish the collapsed state, the first lens cylinder comprises other at least one cam follower provided separately to the plurality of cam followers, the second lens cylinder comprises other at least one cam groove provided separately to the plurality of cam grooves and corresponding to said other at least one cam follower, and at least a part of said other at least one cam follower is configured to engage with at least a part of said other at least one cam groove in a section of the second lens cylinder corresponding to the cutout portion.

(9) In accordance with an embodiment of the invention, the lens barrel further comprises: a cutout portion provided in the second lens cylinder allowing at least one portion of a lens frame retaining other at least one portion of the plurality of lens groups to locate the at least one portion of the lens frame retaining other at least one portion of the plurality of lens groups substantially outside of the second lens cylinder to establish the collapsed state; and a cover plate configured to obstruct the cutout portion of the second lens cylinder to provide a cylindrical surface which substantially continues relative to the inner circumferential section of the second lens cylinder when the first lens cylinder advances and retires along the optical axis, wherein the cover plate includes at least one lid plate cam groove continuing relative to at least one of the plurality of cam grooves passing the cutout portion corresponding to the plurality of cam followers, and the plurality of cam followers is configured to engage with at least a part of the at least one cover plate cam groove in a section of the second lens cylinder corresponding to the cutout portion.

(10) In accordance with an embodiment of the invention, the lens frame, in which the at least one portion thereof is passed through the cutout portion and located substantially outside of the second lens cylinder, retains other at least one lens group in the plurality of lens groups.

(11) To achieve these and other advantages and in accordance with the purpose of the invention, as embodied and broadly described herein, the invention provides a lens barrel according to a third aspect, in which at least one portion of a plurality of lens groups is collapsed to store the plurality of lens groups in a collapsed state and at least one portion of the plurality of lens groups is moved toward an object in a photographing state, the lens barrel comprising: a lens frame retaining at least one portion of the plurality of lens groups; a first lens cylinder supporting the lens frame inside thereof and including a plurality of cam followers and a gear portion on an outer circumferential section thereof; a second lens cylinder including a mutually parallel plurality of cam grooves in an inner circumferential section thereof and storing the first lens cylinder therein in the collapsed state, and an opening provided corresponding to the gear portion, the plurality of cam grooves being engaged with the plurality of cam followers and configured to advance and retire the first lens cylinder in a direction of an optical axis by a relative rotation of the first lens cylinder; a drive gear engaged with the gear portion of the first lens cylinder through the opening of the second lens cylinder to transmit a driving force to the first lens cylinder; and a drive source configured to drive and rotate the drive gear, at least a part of the plurality of cam grooves of the second lens cylinder being provided to pass the opening.

(12) In accordance with an embodiment of the invention, the drive gear includes a gear omitted portion in which a gear thereof is omitted corresponding to a pathway of the at least the part of the plurality of cam grooves passing the opening to avoid interference between the drive gear and the at least the part of the plurality of cam grooves passing the opening.

In addition, the invention provides a camera, comprising the lens barrel according to any one of the lens barrels (1) to (12) described above as an optical system for photographing.

Moreover, the invention provides a mobile information terminal, comprising a camera function part and an optical system using the lens barrel according to any one of the lens barrels (1) to (12) described above as an optical system for photographing of the camera function part.

EFFECT OF THE INVENTION

Therefore, the present invention is possible to provide the lens barrel, the camera and the mobile information terminal capable of using the practically enough number of the cam followers and the cam grooves while the angle of rotation attained by those cam followers and cam grooves is also possible to be increased, and possible to obtain the high degree of freedom in the optical control and to achieve the stable drive.

More specifically, according to the lens barrel (1), it is possible to use the practically enough number of the cam followers and the cam grooves while the angle of rotation attained by those cam followers and cam grooves is also increased.

It is also possible to use the practically enough number of the cam followers and the cam grooves while the angle of rotation attained by those cam followers and cam grooves is also increased, by the lens barrel (2).

According to the lens barrel (3), in particular, it is possible to increase the angle of rotation effectively, and to achieve the stable drive.

According to the lens barrel (4), in particular, it is possible to effectively utilize a space behind the lens group supported by the lens frame in the photographing state.

According to the lens barrel (5), in particular, it is possible to achieve the stable drive and effectively avoid slant and displacement in the direction of the optical axis.

According to the lens barrel (6), in particular, it is possible to effectively suppress the slant and the displacement in the direction of the optical axis in the maximally extended position.

According to the lens barrel (7), in particular, it is possible to effectively suppress the slant and catch in the neighborhood of a boundary part between a linear movement and the rotation in the maximally extended position.

According to the lens barrel (8), in particular, it is possible to effectively avoid the support to be unstable by the cutout portion of the lens cylinder and realize the stable drive in a case in which at least one portion of the lens frame retaining at least one portion of the plurality of lens groups is passed through the cutout portion of the lens cylinder to be located substantially outside of the lens cylinder to establish the collapsed state.

According to the lens barrel (9), in particular, it is possible to further effectively avoid the support to be unstable by the cutout portion of the lens cylinder in a case in which at least one portion of the lens frame retaining at least one portion of the plurality of lens groups is passed through the cutout portion of the lens cylinder to be located substantially outside of the lens cylinder to establish the collapsed state.

According to the lens barrel (10), in particular, it is possible to effectively avoid the support to be unstable by the cutout portion of the lens cylinder in a case in which at least one portion of the lens frame retaining at least one portion of the plurality of lens groups is passed through the cutout portion of the lens cylinder to be located substantially outside of the lens cylinder to establish the collapsed state.

According to the lens barrel (11), in particular, it is possible to increase the angle of rotation even when there is the opening for transmitting the rotation driving force to the inner lens cylinder is provided in the outer lens cylinder.

According to the lens barrel (12), in particular, it is possible to effectively avoid the interference of the drive gear for transmitting the rotation driving force to the inner lens cylinder with the cam follower of the inner lens cylinder.

According to the camera of the invention, it is possible to use the practically enough number of the cam followers and the cam grooves for the lens barrel while the angle of rotation attained by those cam followers and cam grooves is also increased.

According to the mobile information terminal of the invention, it is possible to use the practically enough number of the cam followers and the cam grooves for the optical system for photographing of the camera function part while the angle of rotation attained by those cam followers and cam grooves is also increased.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 9B is a schematic vertical cross-sectional view illustrating a state of the upper half in which the lens groups are extended in the photographing state as similar to FIG. 9A to a wide angle position.

DESCRIPTION OF NUMERALS

Figure 1:
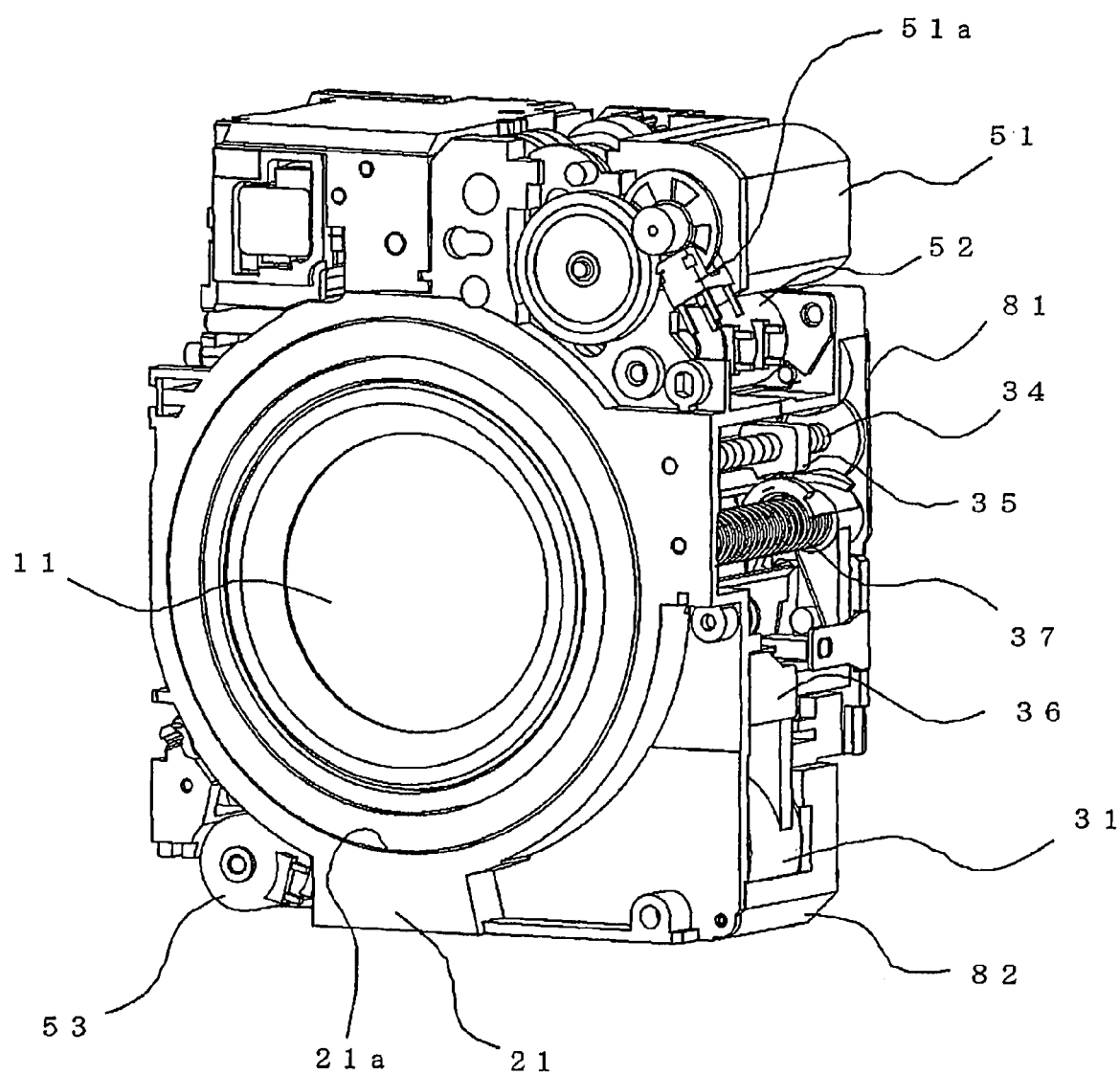
FIG. 1 is a schematic perspective view illustrating a structure of a main part of an optical system device including a lens barrel according to a first preferred embodiment of the invention with lens groups collapsed, as viewed from an object.

11 First lens group
12 Second lens group
13 Third lens group
14 Fourth lens group
15 Shutter/aperture stop unit
16 Solid-state image-sensing device
17 First frame
18 Cover glass
19 Low-pass filter
21 Fixed frame
21a Fixed cylinder
21k Linear groove
21m Cam groove (Main-hericoid)
21n Cam groove (Main-hericoid)
21s Cam groove (Sub-hericoid)
22 First rotary cylinder
22a Cam follower (Main-hericoid)
22b Cam follower (Main-hericoid)
22s Cam follower (Sub-hericoid)
22g Gear portion
23 First liner
24 Second rotary cylinder
25 Second liner
26 Cam cylinder
27 Lineally-moving cylinder
31 Third frame
32 Third group main-guide shaft
33 Third frame sub-guide shaft
34 Third group lead screw
35 Third frame female screw member
36 Impact-preventing member
37 Compression torsion spring
38 Third-frame photo-interrupter (Position detecting device)
41 Fourth frame
42 Fourth frame sub-guide shaft
43 Fourth frame spring
44 Fourth frame main-guide shaft
45 Fourth frame lead screw
46 Fourth frame female screw member
47 Fourth group photo-interrupter
51 Zooming motor
52 Third frame drive motor
53 Fourth frame drive motor
61 Barrier control member 62 Lens barrier
63 Barrier drive system
71 Gear
72 Gear
73 Gear
74 Gear
75 Drive gear
81 Retainer plate
82 Lens barrel base
101 Photographing lens
102 Shutter release button
103 Zoom lever
104 Viewfinder
105 Strobe light
106 Liquid crystal display (LCD)
107 Operating button
108 Power switch
109 Memory card slot
110 Expansion card slot
201 Light-receiving element (Area sensor)
202 Signal-processing unit
203 Image-processing unit
204 Central processing unit (CPU)
205 Semiconductor memory
206 Expansion card
301 Barrier-operating element

BEST MODE FOR CARRYING OUT THE INVENTION

Reference will now be made in detail to the present preferred embodiments of the present invention, examples of which are illustrated in the accompanying drawings. Wherever possible, the same reference numbers are used in the drawings and the description to refer to the same or like parts. The scope of the present invention, however, is not limited to these embodiments. Within the scope of the present invention, any structure and material described below can be appropriately modified.

FIGS. 1 to 22 illustrate structures of main parts and various operational states of an optical system device including a lens barrel according to a first preferred embodiment of the invention.

In FIGS. 1 to 22, the lens barrel includes a fixed frame 21 having a fixed cylinder 21a, a telescopic cylinder unit or telescopic cylinder attached to the fixed frame 21, and a plurality of lens groups disposed in the telescopic cylinder. The telescopic cylinder is movable and collapsible along an optical axis X of the plurality of lens groups.

Figure 9A:
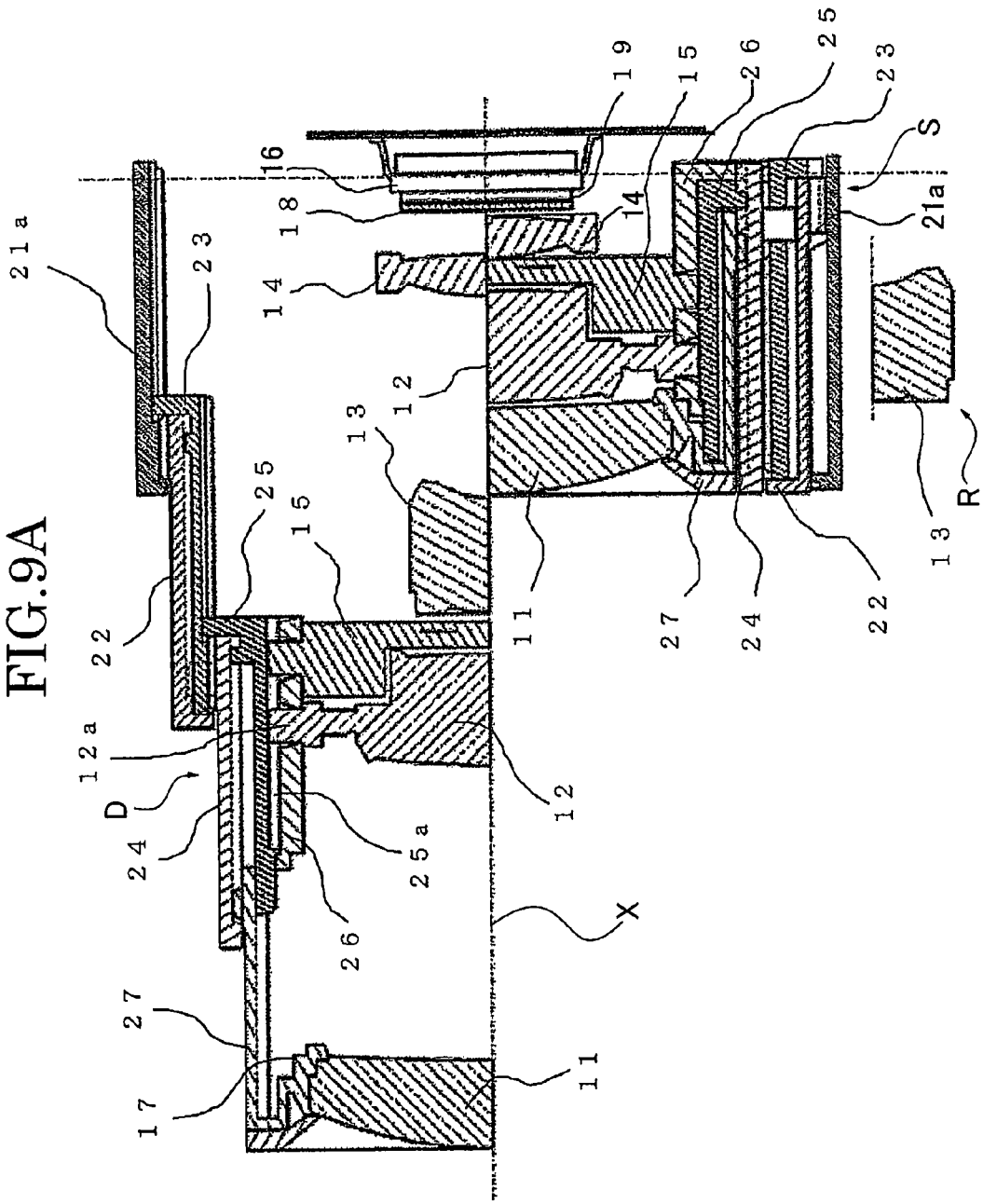
FIG. 9A is a schematic vertical cross-sectional view illustrating main parts of the lens groups, the lens frames and various lens cylinders in the lens barrel, in which different states thereof are illustrated in an upper half and a lower half with respect to an optical axis, respectively, and wherein the upper half illustrates the photographing state in which the lens groups are extended, and the lower half illustrates a collapsed state in which the lens groups are retired to be collapsed.

The lens groups comprise, for example, a first lens group 11, a second lens group 12, a third lens group 13, and a fourth lens group 14, which are disposed in the telescopic cylinder (see FIGS. 9A and 9B).

The telescopic cylinder includes, for example, a first rotary cylinder 22, a first liner 23, a second rotary cylinder 24, a second liner 25, a cam cylinder 26, a lineally-moving cylinder 27, and a third frame 31 (see FIGS. 5 and 8) for retaining the third lens group 13. As described below, the first rotary cylinder 22 and so on are moved along the optical axis with respect to each other with the plurality of lens groups 11 to 14.

As illustrated in FIGS. 9A and 9B, the first, second, third, and fourth lens groups 11, 12, 13, and 14 are positioned from an object (not illustrated) in sequence and disposed on the optical axis X. A shutter/aperture stop unit 15 is disposed between the second lens group 12 and the third lens group 13. The first, second, third, and fourth lens groups 11, 12, 13, and 14, and the shutter/aperture stop unit 15 are configured to be movable in a direction of the optical axis when the telescopic cylinder is moved along the optical direction.

To use the lens barrel for image forming apparatuses or optical devices such as digital cameras or the like, as described hereinafter, for example, a solid-state image-sensing device 16 comprising a CCD (Charge-Coupled Device) or the like is disposed adjacent to the side of an image forming plane of the fourth lens group 14.

Referring to FIGS. 9A and 9B, the first lens group 11 is attached to a first frame 17, and various optical filters such as a low-pass filter, a cover glass, other optical elements and so on for example are disposed adjacent to an image-receiving surface of the CCD 16, if needed.

Generally, as illustrated in FIGS. 9A and 9B, the lens barrel is structured such that the first to fourth lens groups are movable between a collapsed position S stored in the fixed cylinder 21a and an extended position D extended out of the fixed cylinder 21a so as to achieve a zooming, and at least one lens group of the first to fourth lens groups can be retracted out of the optical axis into a retracted position as illustrated at R in FIGS. 9A and 9B. In the preferred embodiment, at least one portion of the third lens group 13 is retracted from the optical axis passing through a through hole provided in the fixed cylinder 21a into a stored part provided in the fixed cylinder 21a and corresponding to the retracted position as described above.

Note that any shape or structure may be used instead of the fixed cylinder 21a. For example, a plurality of peripherally spaced slidable bars or bands may be used, or at least three beams each in a pillar configuration may be provided continuously or implanted on the fixed frame 21 such that the first rotary cylinder 22 is retained inside surrounded by the beams, without being limited to the cylinder shape of the fixed cylinder 21a, and such shapes and structures are also included as a concept of the cylinder.

In regard to this, a further detailed description will be described hereinafter.

The first lens group 11 to the fourth lens group 14 have a zoom lens function in which a focal distance is variable, as described hereinafter. The first lens group 11 includes one or more lens, and is fixed to the lineally-moving cylinder 27 via the first frame 17, which retains the first lens group 11 integrally.

The second lens group 12 includes one or more lens. A cam follower formed on a second frame (not specifically illustrated) for integrally retaining the second lens group 12 is inserted into a cam groove for the second lens group 12 formed on the cam cylinder 26 illustrated in FIG. 11, and engages with a linear groove 25a of the second liner 25, and the second lens group 12 is supported by the cam cylinder 26 and the second liner 25.

Figure 11:
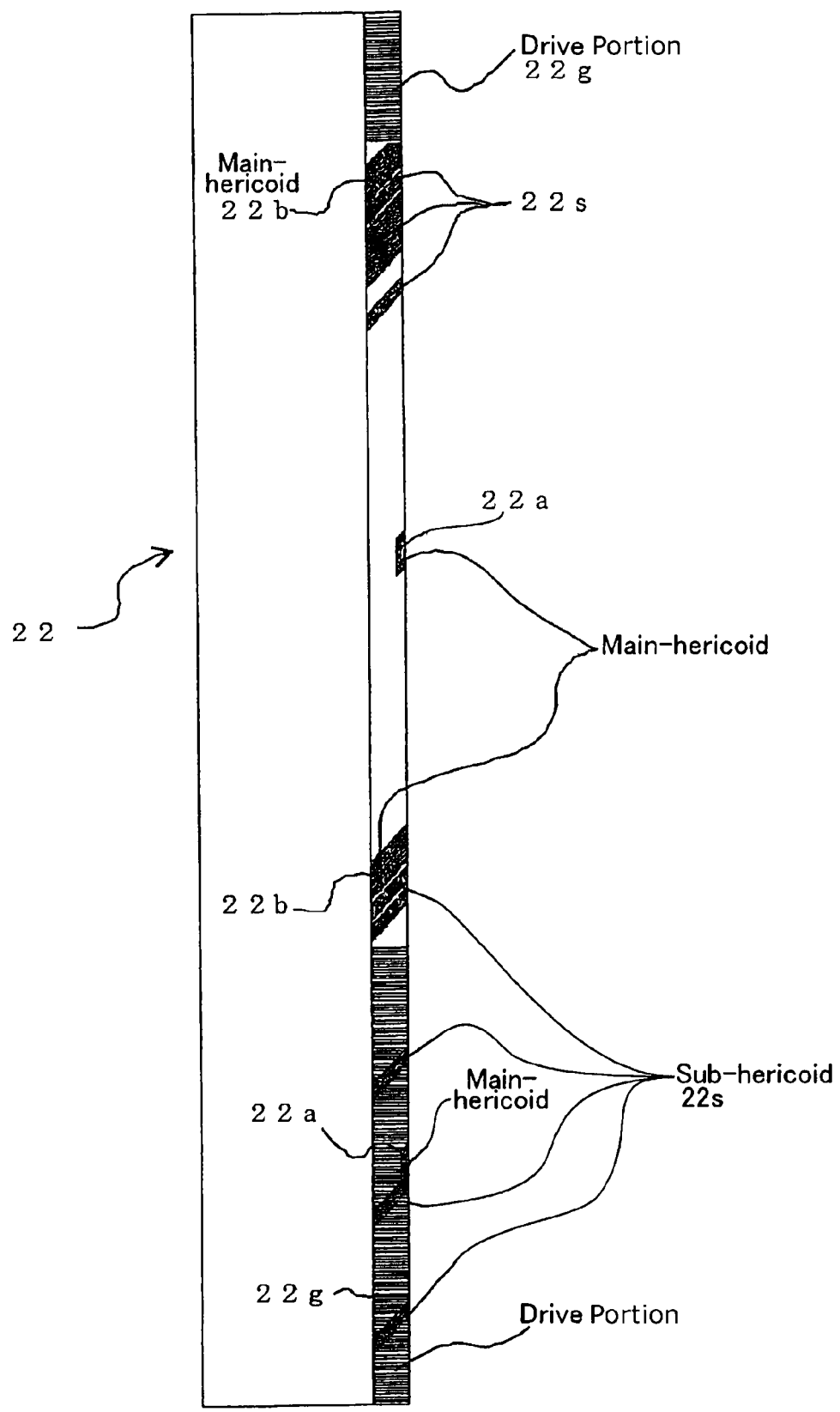
FIG. 11 is a schematic development view illustrating shapes of cam followers in the helicoid configuration and a gear portion formed on a first rotary cylinder as viewed from the optical axis.

The shutter/aperture unit 15 includes a shutter and an aperture, and a cam follower formed integrally with the shutter/aperture unit 15 is inserted into a cam groove for the shutter/aperture of the cam cylinder 26 illustrated in FIG. 11 and is engaged with the linear groove 25a on the second liner 25 so that the shutter/aperture unit is supported by the cam cylinder 26 and the second liner 25.

The fixed frame 21 includes a cylindrical part having an inner surface which is formed with a linear groove 21k and helicoidal cam grooves 21m, 21n and 21s along an axial direction, as illustrated in FIG. 10, FIGS. 12A to 12D and FIGS. 13A to 13C. Helicoidal cam followers 22a, 22b and 22s are formed on an outer peripheral surface of a base portion of the first rotary cylinder 22 and engage with the helicoidal cam grooves 21m, 21n and 21s, as illustrated in FIG. 11, FIGS. 14A to 14C and FIGS. 15A and 15B. A key portion formed on an inner surface of a base portion of the first liner 23 engages with the linear groove 21k of the fixed cylinder 21a of the fixed frame 21.

An inner surface of the first rotary cylinder 22 is formed with a guide groove extending along a plane transverse to the optical axis (photographing optical path) X. Engaged with the guide groove is a follower or key which is formed to project from the outer peripheral surface of the first liner 23 in the vicinity of the base portion thereof and acts as a linear member. An inner surface of the first liner 23 is formed with a linear groove and a helicoid along the optical axis X. The first liner 23 is also formed with a clearance groove in which a cam follower formed to project from an outer peripheral surface of a base portion of the second rotary cylinder 24 in the vicinity of the base portion is inserted.

A helicoid is formed on the outer peripheral surface of the base portion of the second rotary cylinder 24, and is engaged with the helicoid of the first liner 23. A cam follower formed to project from the outer peripheral surface of the second rotary cylinder 24 in the vicinity of the base portion engages with the linear groove formed in the inner periphery of the first rotary cylinder 22 through the clearance groove of the cam follower on the first liner 23. A key portion formed to project from the outer peripheral surface of the base portion of the second liner 25 engages with the linear groove provided on the inner peripheral surface of the first liner 23.

An inner surface of the second rotary cylinder 24 is provided with a guide groove along a plane transverse to the optical axis X, a follower or key provided to project from the outer peripheral surface of the second liner 25 is engaged in the guide groove of the second rotary cylinder 24. With such a structure, the second liner 25 moves with the second rotary cylinder 24 in the movement along the optical axis X, while the second rotary cylinder 24 is rotatable relative to the second liner 25.

The cam cylinder 26 fitted to the inner periphery of the second liner 25 is configured in such a manner that an engaging projection formed on the outer peripheral surface of the base portion is fitted to and engaged with the base portion of the second rotary cylinder 24 so as to rotate integrally with the second rotary cylinder 24. The inner surface of the second liner 25 is provided with a guide groove along a surface transverse to the optical axis X, and a follower or key provided on the outer peripheral surface (front side) of the cam cylinder 26 engages with the cam groove. With such a structure, the cam cylinder 26 moves with the second liner 25 in the movement along the optical axis X, while is rotatable relative to the second liner 25.

The base portion of the lineally-moving cylinder 27 is inserted between the second rotary cylinder 24 and the second liner 25, and a cam follower is formed to project from the outer peripheral surface of the lineally-moving cylinder 27 in the vicinity of the base portion, and the cam follower engages with the cam groove formed in the inner peripheral surface of the second rotary cylinder 24. A linear groove is formed on the inner peripheral surface of the lineally-moving cylinder 27 along the axial direction, and the key portion formed on the outer peripheral surface of the second liner 25 engages with the linear groove.

A gear portion 22g is formed on the outer periphery of the base portion of the first rotary cylinder 22. A gear portion 75 (FIG. 13C) is engaged with one or more gears which are driven by the zooming motor 51 (FIG. 1) so that a drive force of the zooming motor 51 is transmitted to the gear portion 75 via the gears. The drive gear 75 is disposed at one side portion of the fixed cylinder 21a and is rotatably supported by the fixed frame 21 in such a manner that a part of the drive gear 75 appears from an opening formed on the fixed cylinder 21a. Thus, the drive gear 75 is engaged with the gear portion 22g of the first rotary cylinder 22 through the opening formed on the fixed cylinder 21a.

Accordingly, the gear portion 22g is driven by the rotation of the drive gear 75, and whereby, the first lens group 11, the second lens group 12, and the shutter/aperture unit 15 are zoomed in a predetermined manner.

Figure 10:
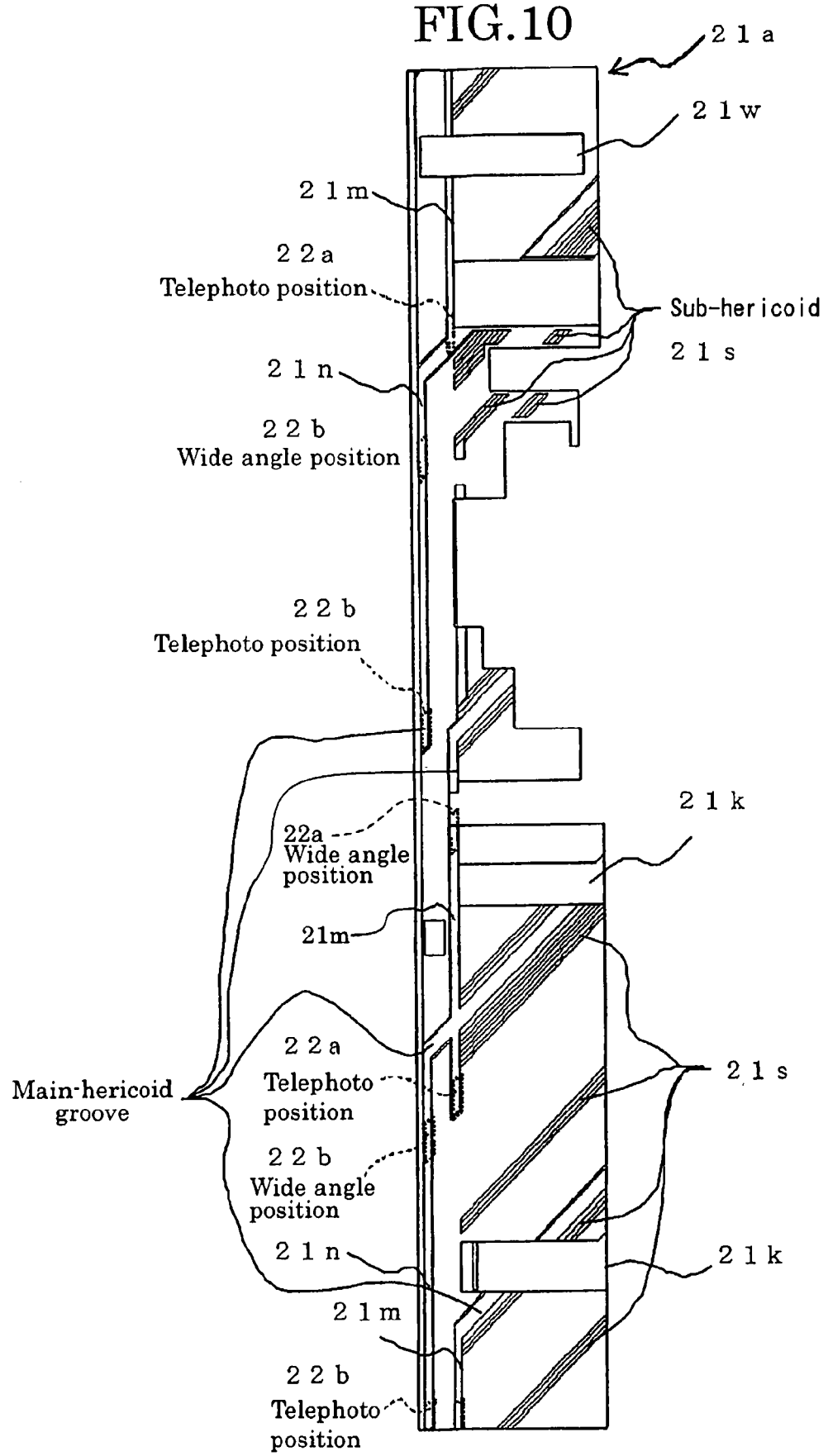
FIG. 10 is a schematic development view illustrating shapes of cam grooves in a helicoid configuration and linear grooves formed on a fixed cylinder, as viewed from the optical axis.

Meanwhile, the linear groove 21k and the cam grooves 21m, 21n and 21s formed in an inner peripheral surface of the fixed cylinder 21a of the fixed frame 21, i.e., the linear groove 21k engaging with the key portion of the first liner 23 and the hericoidal cam grooves 21m, 21n and 21s engaging with the hericoidal cam followers 22a, 22b and 22s of the first rotary cylinder 22, are illustrated in FIG. 10. Also, the gear portion 22g and the hericoidal cam followers 22a, 22b and 22s formed in the outer circumferential surface of the first rotary cylinder 22, i.e., the gear portion 22g engaging with the drive gear 75 and the hericoidal cam followers 22a, 22b and 22s engaging with the hericoidal cam grooves 21m, 21n and 21s of the fixed cylinder 21a, are illustrated in FIG. 11.

Generally, the rotary cylinder, which is the closest position to the fixed cylinder 21a and positioned on the outermost circumference is generally screwed onto the fixed cylinder through a helicoid, and the helicoid is configured to move the rotary cylinder at a constant speed relative to the fixed frame. Therefore, the rotary cylinder is in a half-extended state out of the fixed frame in a short focal length/wide angle in a course in which the rotary cylinder is moved gradually from the collapsed position through the short focal length/wide angle position to a long-focus/telephoto position.

On the contrary, in the structure described above, the first rotary cylinder 22 adjacent to the fixed cylinder 21a is threaded with the fixed cylinder 21a of the fixed frame 21 via the cam grooves 21m, 21n of the helicoidal shape without a simple helicoidal connection. The first rotary cylinder 22 is moved completely to the maximally extended position by being driven from the collapsed position to the short focal length/wide angle position. Thereafter, as illustrated in FIG. 10, because the object side end of the cam grooves 21m, 21n lies in parallel with a plane to which the optical axis crosses vertically, the first rotary cylinder 22 rotates at a constant position without moving along the optical axis X during driving from the short focal length/wide angle position to the long-focus/telephoto position.

In detail, as illustrated in FIG. 10, the cam grooves 21m and 21n as a main-hericoid are formed on the fixed cylinder 21a of the fixed frame 21, and the cam followers 22a and 22b as the main-hericoid of the first rotary cylinder 22 engage with the cam grooves 21m and 21n, respectively. As can be seen from FIG. 11, FIGS. 14A to 14C and FIGS. 15A and 15B, in the present preferred embodiment, the two cam followers 22a and the two cam followers 22b as the main-hericoid of the first rotary cylinder 22 are circumferentially and alternately disposed generally at intervals close to even intervals, and the two cam followers 22a and the two cam followers 22b are arranged to be spaced at a predetermined distance in the direction of optical axis, mutually.

More specifically, the two cam followers 22a virtually contact with a base end surface in an image side of the first rotary cylinder 22 and are disposed generally at positions different from each other circumferentially at 180 degrees. The two cam followers 22b are spaced from the cam followers 22a and located nearer to the object side than the cam followers 22a at the predetermined distance, and are, in a circumferential direction, disposed generally at positions different from each other at 180 degrees between the two cam followers 22a, respectively. Accordingly, the two cam grooves 22m and the two cam grooves 22n, engaged with the two cam followers 22a and the two cam followers 22b respectively, are arranged at the positions displaced at the predetermined distance in the optical axis direction and displaced generally at 90 degrees with respect to the circumferential direction.

The cam grooves 21m and 21n each include an inclined part which runs from an end portion of the image plane side to the plane to which the optical axis crosses vertically and inclined relative to the optical axis to run from the end portion of the image plane side, and a transverse part which runs in parallel with the plane to which the optical axis crosses vertically in an area proximity to an end portion of the object side. Thus, when the first rotary cylinder 22 rotates, the first rotary cylinder 22 moves along the optical axis between the collapsed position and a photographing position by the inclined part through the cam followers 22a and 22b of the main hericoid, and thereafter, when the first rotary cylinder 22 reaches the maximally extended position, the first rotary cylinder 22 rotates without moving toward the optical axis direction.

Therefore, since the cam grooves 21m and 21n are disposed to be displaced mutually in the optical axis direction, the transverse parts of the cam grooves 21m only intersect with the inclined parts of the cam grooves 21n as illustrated in the drawings, and hence, there is almost no operational interference between the cam grooves 21m and 21n even when an angle of rotation of the cam grooves 21m and 21n is increased.

In addition, in the present preferred embodiment, the two cam grooves 21m are disposed at the different positions with each other generally at 180 degrees, whereas the two cam grooves 21n are also disposed at the different positions with each other generally at 180 degrees, so that secure support of the first rotary cylinder 22 is maintained by a total of four followers of the cam followers 22a and the cam followers 22b. Moreover, while slant of the first rotary cylinder 22 is thus avoided, each of the cam grooves 21m and 21n is possible to be disposed by utilizing a circumferential range of substantially 180 degrees. Hence, it is possible to widen an effective range of each cam.

Meanwhile, as can be seen from FIG. 10, FIGS. 12A to 12D and FIGS. 13A to 13C, the fixed cylinder 21a of the fixed frame 21 may be difficult to be formed in a complete cylindrical shape, and in particular, a cutout portion and the opening to allow the third frame 31 to move into and out from the optical path, to allow the drive gear 75 to engage with the gear portion 22g for rotational driving of the first rotary cylinder 22, and so on, are formed on an area other than the end portion of the object side, the engagement between the cam groove 21m, 21n and the cam followers 22a, 22b may be released with respect to such an area other than the end portion of the object side formed with the cutout portion and the opening, and thus the support of the first rotary cylinder 22 may become unstable. Accordingly, for the inclined parts, the plural cam grooves 21s as a sub-hericoid are formed between the cam grooves 21m and the cam grooves 21n as the main-hericoid. The cam grooves 21s as the sub-hericoid are engaged with the cam followers 22s as the sub-hericoid which are appropriately disposed, for example, in the gear portion 22g, between the cam followers 22a and the cam followers 22b as the main-hericoid, at positions in proximity thereto and so on, of the first rotary cylinder 22 for the support of the first rotary cylinder 22 with a plurality of supporting points, so as to make the stable support of the first rotary cylinder 22 possible. Here, since the first rotary cylinder 22 includes the cam followers 22a, 22b and 22s which are operated integrally, the cam grooves 21m and 21n as the main-hericoid and the cam grooves 21s as the sub-hericoid are all formed to be in parallel, mutually.

Figure 12A:
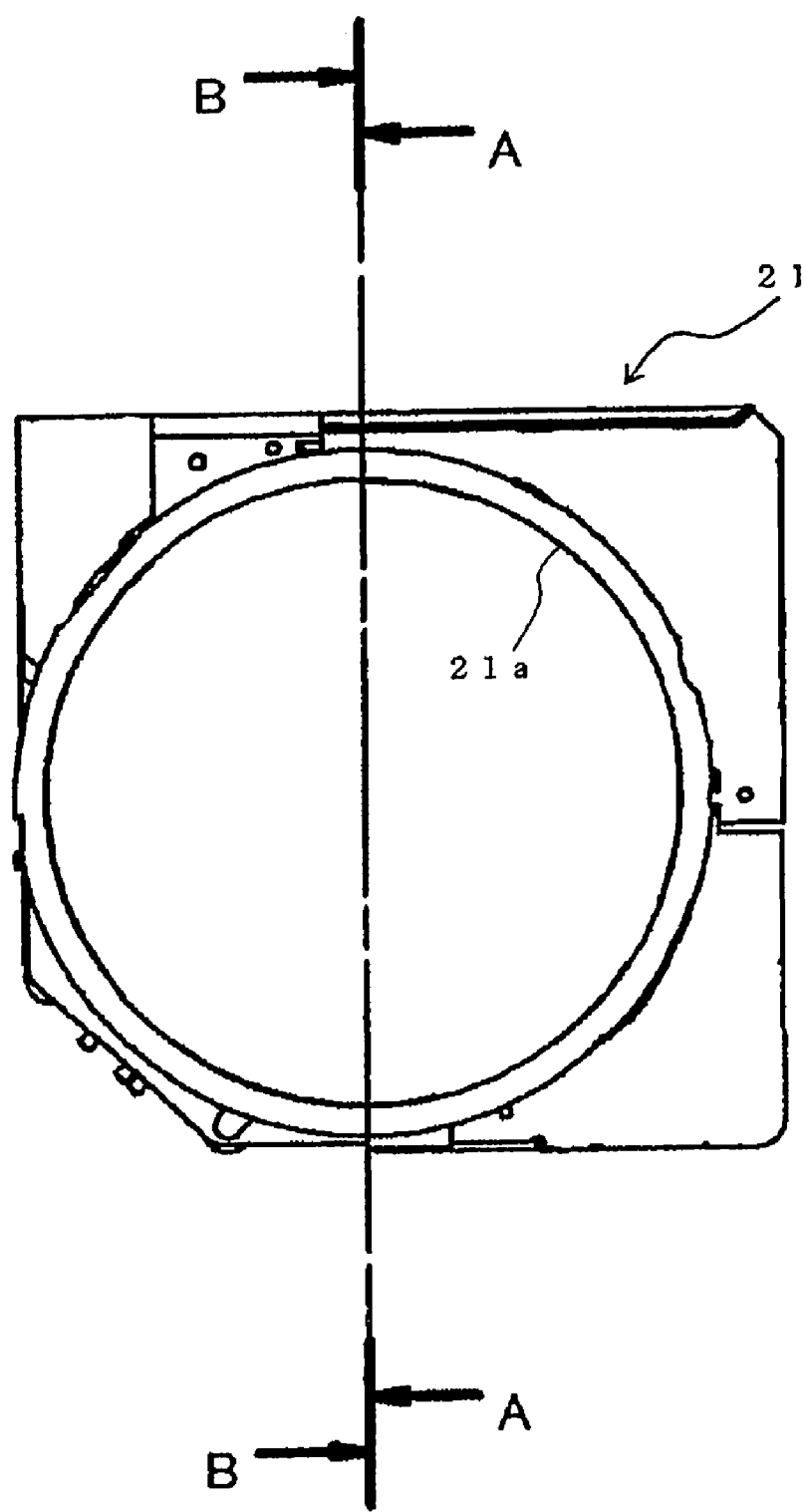
FIG. 12A is a schematic front view illustrating a shape of a fixed frame as viewed from the object.
Figure 12B:
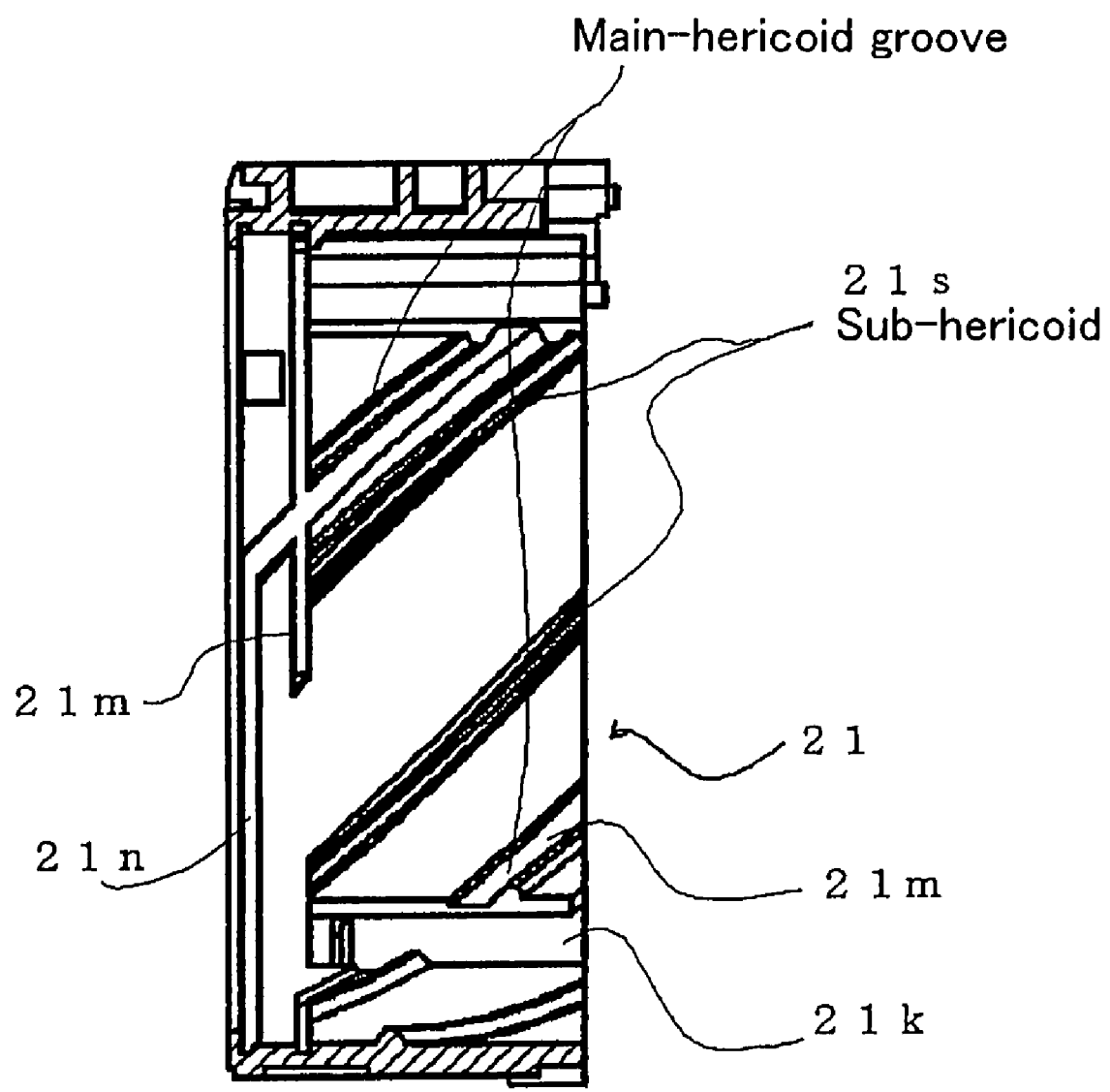
FIG. 12B is a schematic cross-sectional view taken along a line connecting arrows A-A and viewed in arrows A direction illustrated in FIG. 12A.
Figure 12C:
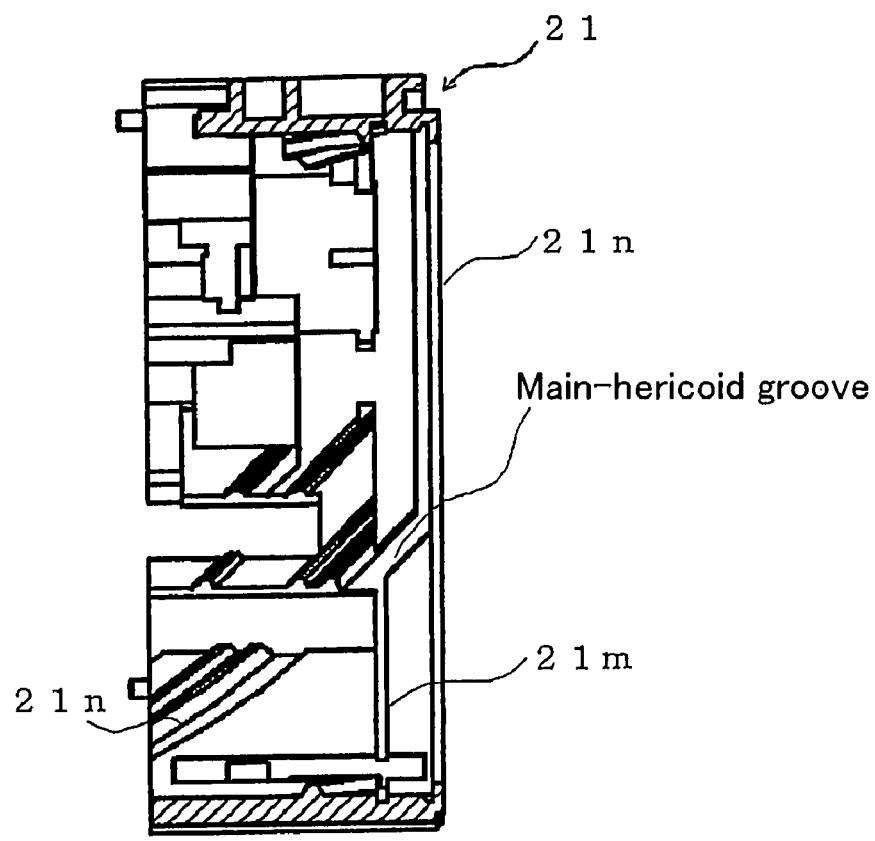
FIG. 12C is a cross-sectional view taken along a line connecting arrows B-B and viewed in arrows B direction illustrated in FIG. 12A.
Figure 12D:
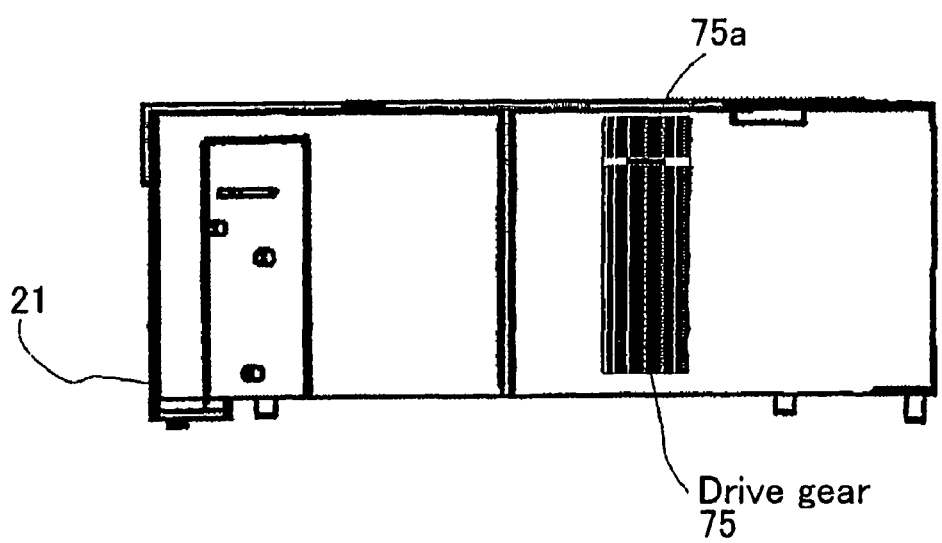
FIG. 12D is a schematic bottom view of FIG. 12A.
Figure 13A:
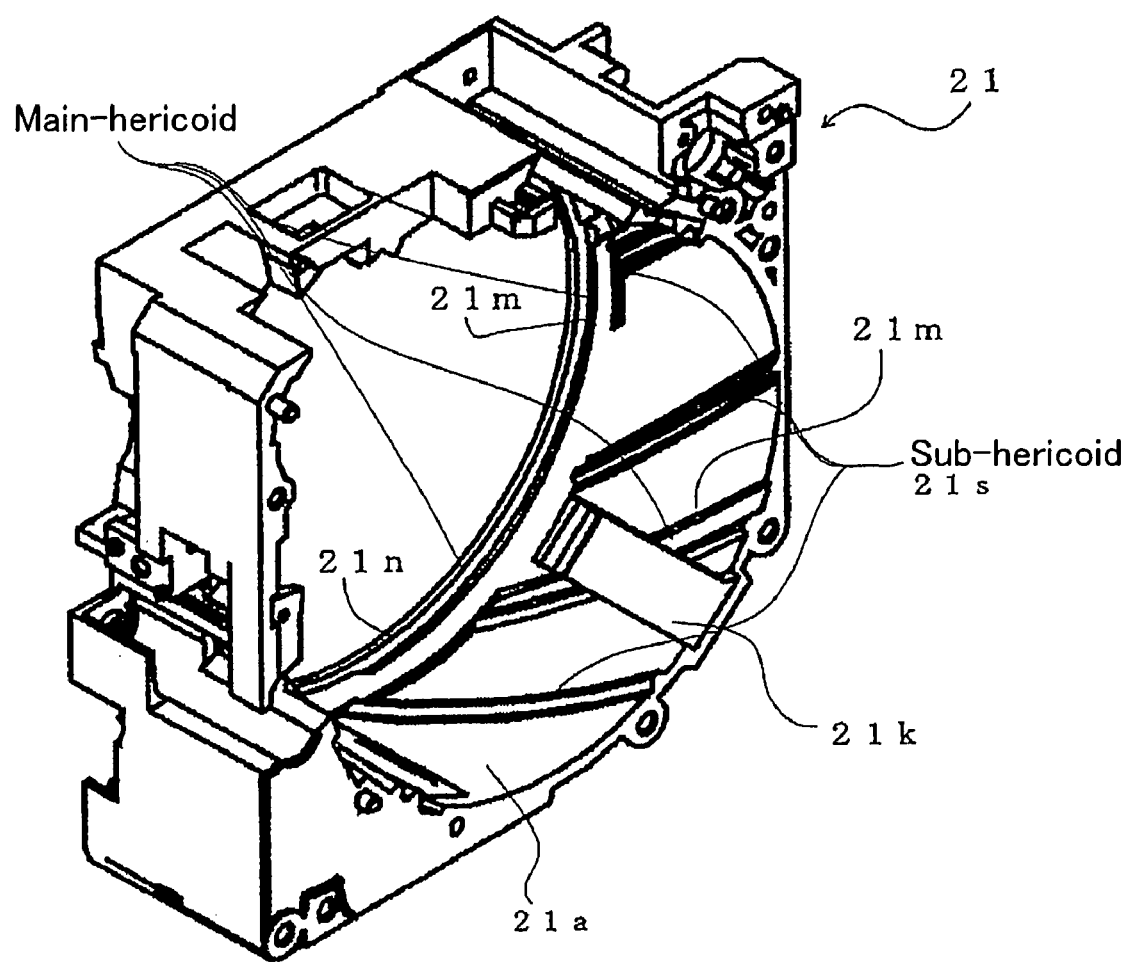
FIG. 13A is a schematic perspective view illustrating the shape of the fixed frame as viewed from upper-left of an image plane side.
Figure 13B:
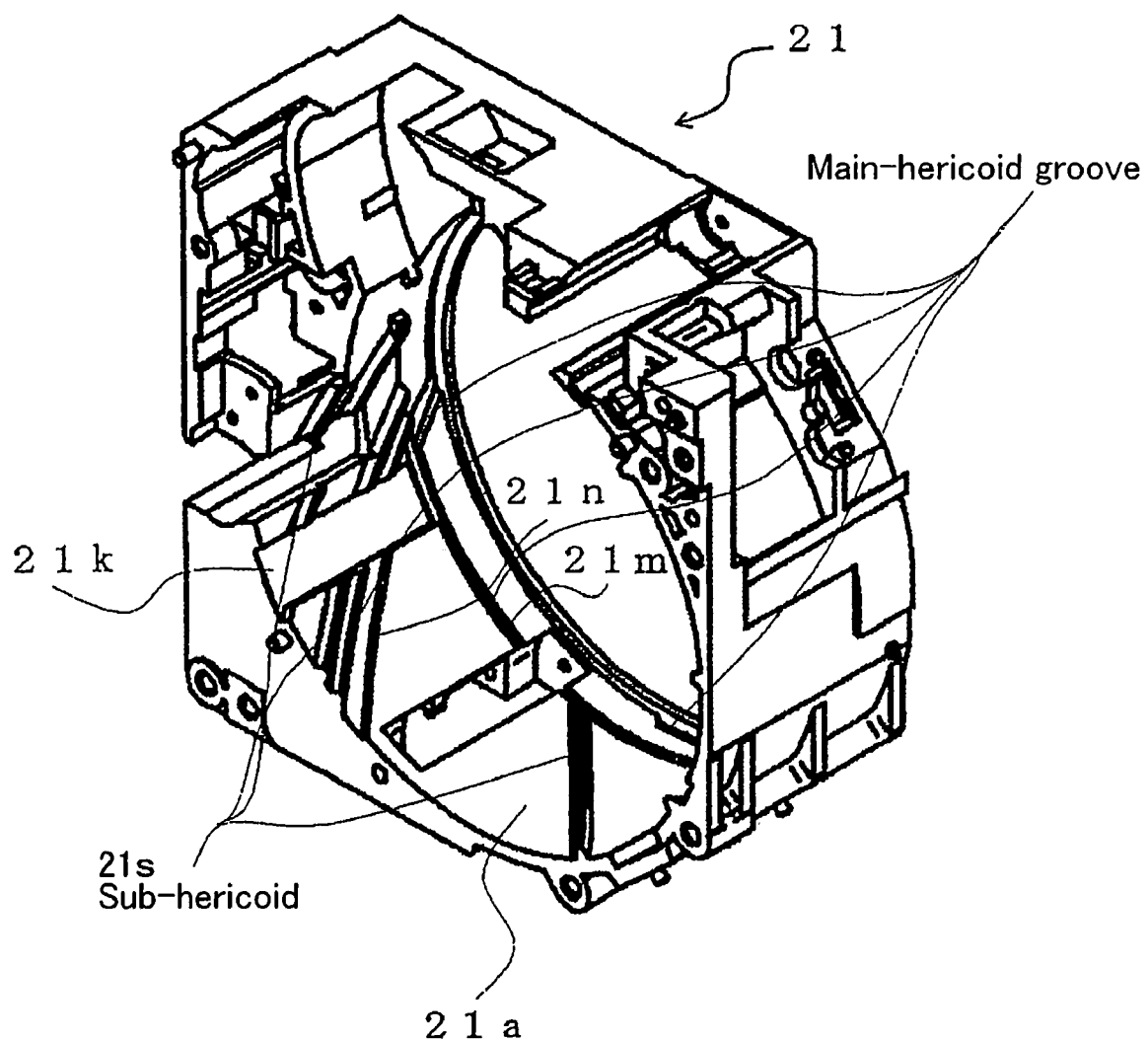
FIG. 13B is a schematic perspective view illustrating the fixed frame as viewed from upper-right of the image plane side.
Figure 13C:
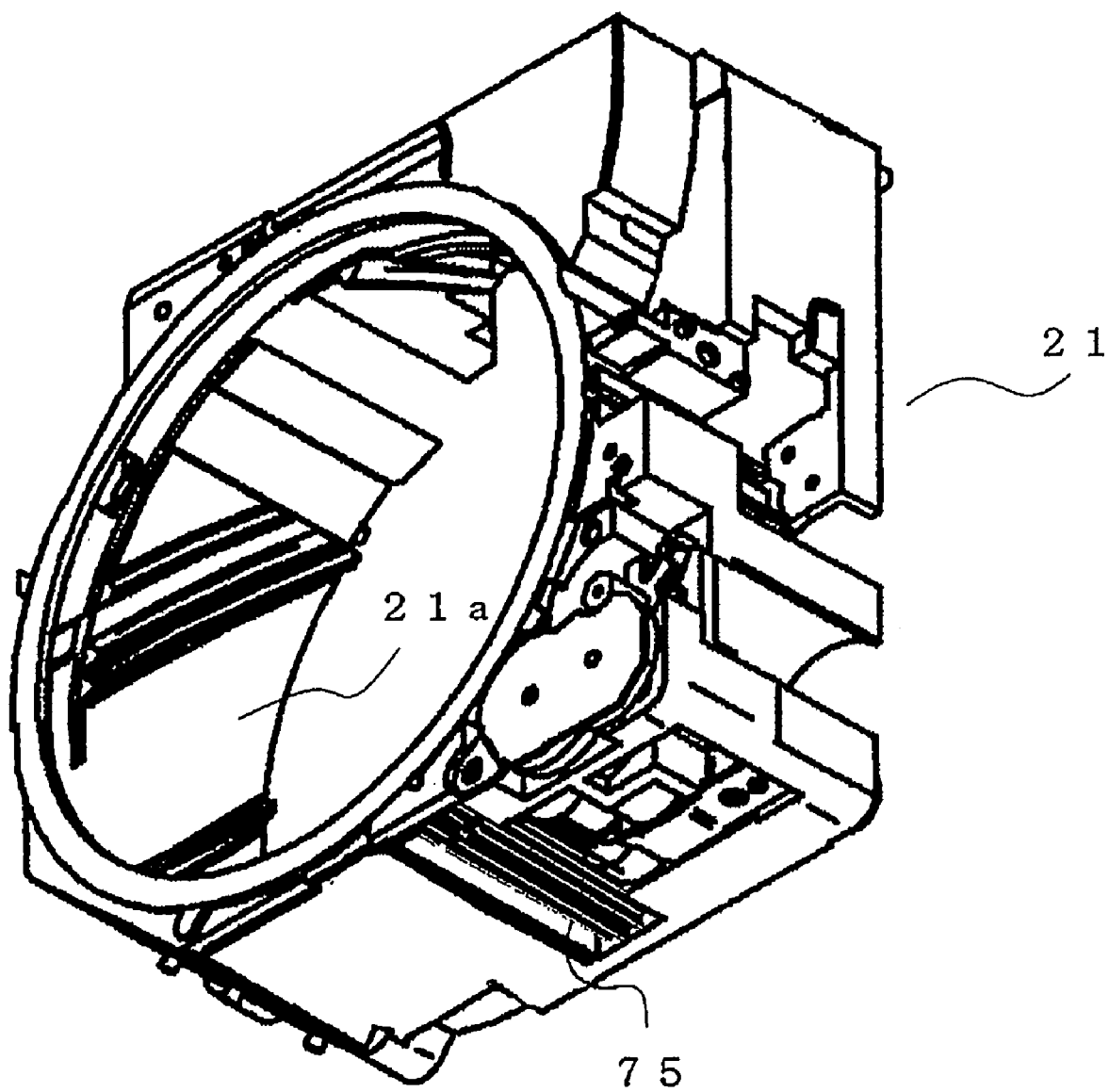
FIG. 13C is a schematic perspective view illustrating the fixed frame as viewed from lower-right of an object side.
Figure 14A:
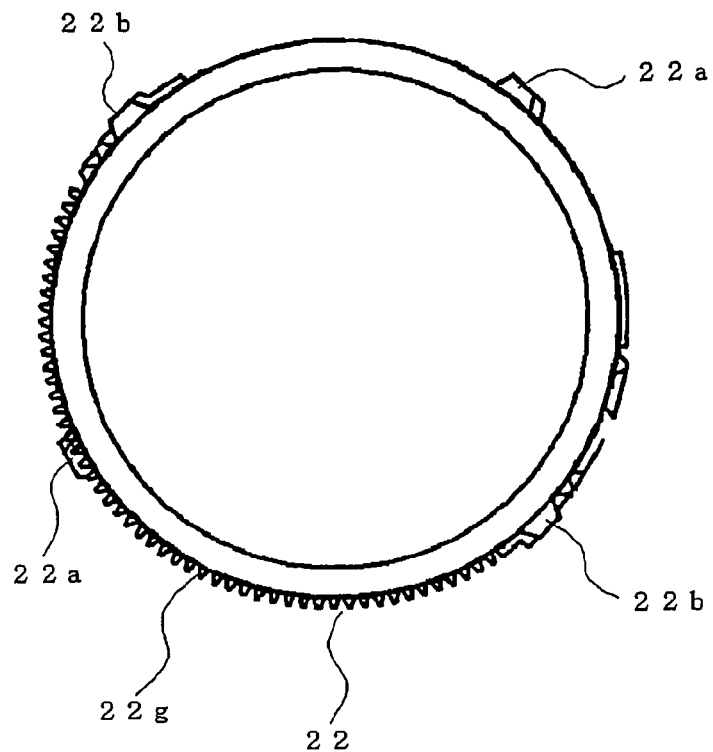
FIG. 14A is a schematic front view illustrating a shape of the first rotary cylinder as viewed from the object side.
Figure 14B:
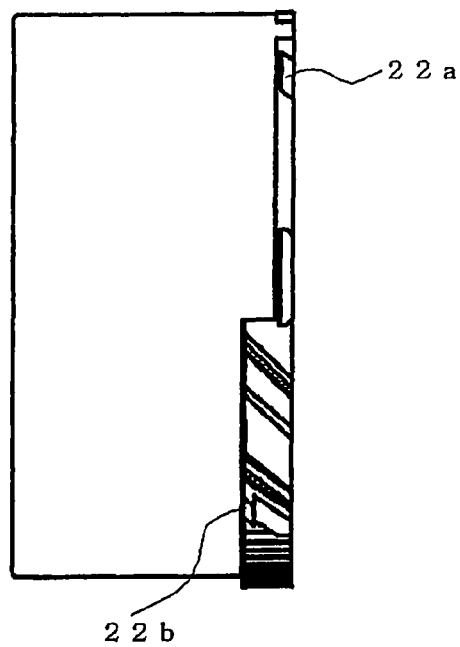
FIG. 14B is a schematic right side view of FIG. 14A.
Figure 14C:
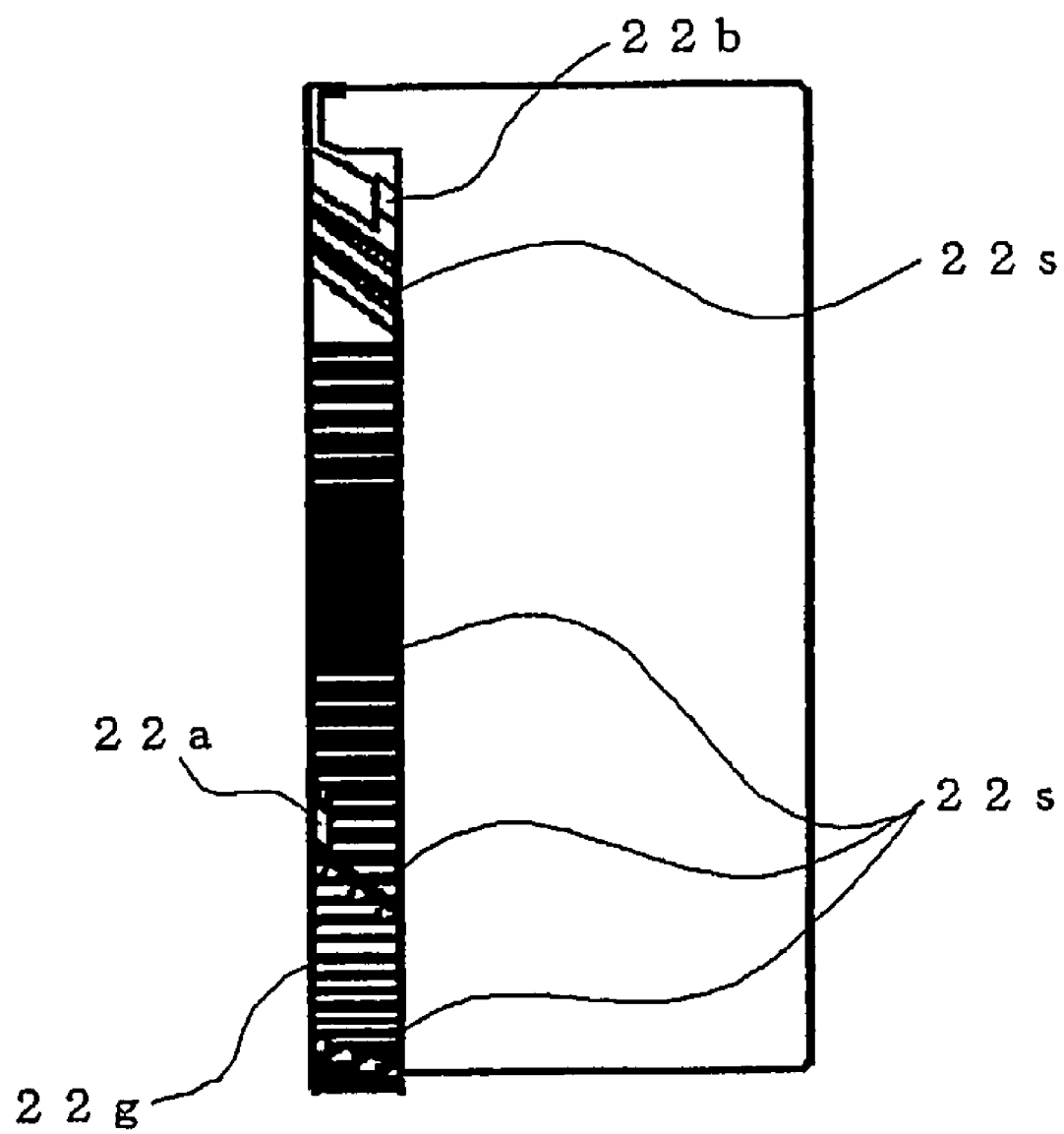
FIG. 14C is a schematic left side view of FIG. 14A.
Figure 15A:
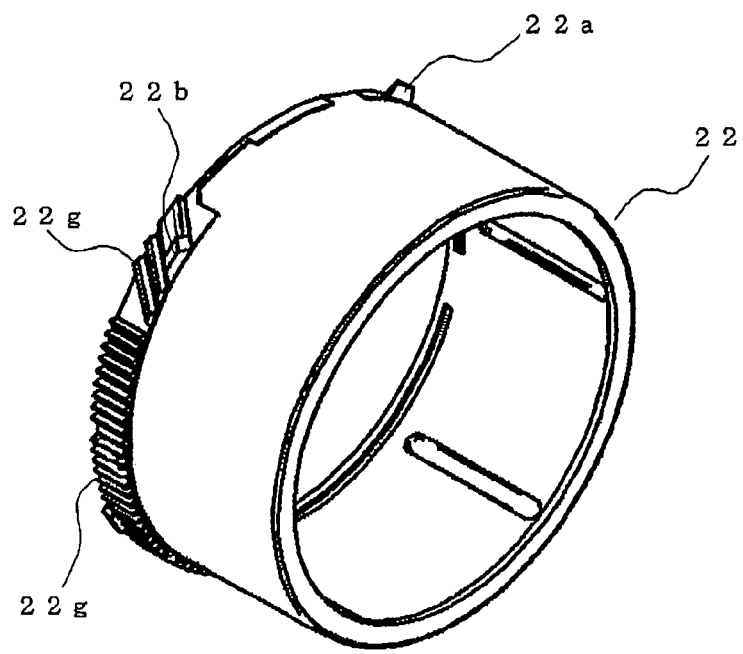
FIG. 15A is a schematic perspective view illustrating the shape of the first rotary cylinder as viewed from upper-left of the object side.
Figure 15B:
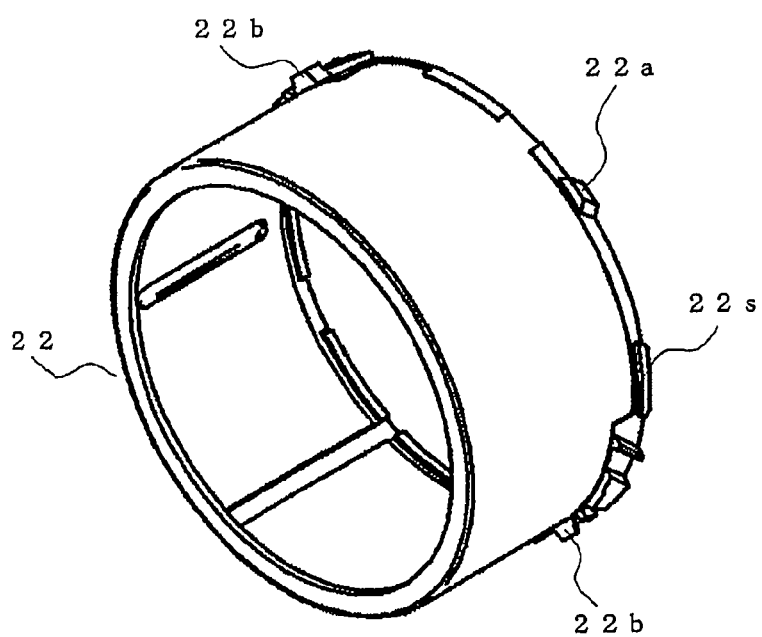
FIG. 15B is a schematic perspective view illustrating the first rotary cylinder as viewed from upper-right of the object side.

Also, as illustrated in FIGS. 12D and 13C, the drive gear 75 is disposed in the above-described one side portion of the fixed cylinder 21a along the optical axis, and the drive gear 75 is engaged with the gear portion 22g of the first rotary cylinder 22 through the opening 21w (see FIG. 10) provided on the fixed cylinder 21a. Accordingly, as illustrated in FIG. 10, the transverse part of the cam groove 21m for example strides over and passes the opening 21w. Hence, since the cam follower 22a as the main-hericoid interferes with the drive gear 75, a gear omitted portion 75a (FIG. 12D) in which the gear is eliminated to provide a void is formed in a part of the drive gear 75 corresponding to the cam groove 21m. Thereby, the cam follower 22a traveling along the cam groove 21n for example is prevented from interfering with the drive gear 75 when the first rotary cylinder 22 rotates without moving in the optical axis direction in the maximally extended position by the transverse parts of the cam grooves 21m and 21n as the main-hericoid.

Note that, although the above explanation is based on the case in which the transverse part of the cam groove 21m goes across the part of the drive gear 75, a similar structure is possible to apply to a case in which the inclined part of the cam groove 21m passes the part of the drive gear 75 for example. However, in such a case, a size in the optical axis direction of the gear omitted portion 75a in which the gear is removed to be the void of the drive gear 75 may be smaller than a size in the optical axis direction of the gear portion 22g of the first rotary cylinder 22. Therefore, the size of the gear portion 22g of the first rotary cylinder 22 in the optical axis direction may be increased or other appropriate measures may be taken depending upon an angle of inclination of the cam groove 21m passing the part of the drive gear 75 for example.

The linear groove 21k of the fixed cylinder 21a of the fixed frame 21 is provided in parallel to the optical axis, and the key portion of the first liner 23 engages with the linear groove 21k, such that the first liner 23 goes straight without rotating.

Therefore, as the first rotary cylinder 22 is moved from the collapsed position to short focal length/wide angle position, it is extended toward the object, while rotating in an early stage of the extending out action and when it reach the maximally extended position, a zoom position-detector which is provided on the fixed frame 21 and comprising a photo-reflector, photo-interrupter, leaf switch or the like, for example, generates a zoom position-reference signal. Therefore, when the zoom position-reference signal generates, because it may be determined that the first rotary cylinder 22 reaches the maximally extended position, it is possible to initiate to move a retractable lens retaining frame, i.e. the third frame 31 in the present preferred embodiment, onto the optical axis X.

Consequently, a space between the second lens group 12 and the fourth lens group 14 to insert the third lens group 13 into the optical axis X can be secured previously by completely extending out the first rotary cylinder 22 and the first liner 23 adjacent to the fixed frame at the earlier step of the extended action.

As described below, as soon as the first rotary cylinder 22 reaches the maximally extended position, the zoom position-reference signal generates, the space for inserting the third lens group is secured, and immediately, the insertion of the third lens group is initiated. Therefore, a time taking to transit from the collapsed state when an electric source is turned on to the short focal length/wide angle state can be much shortened.

Figure 2:
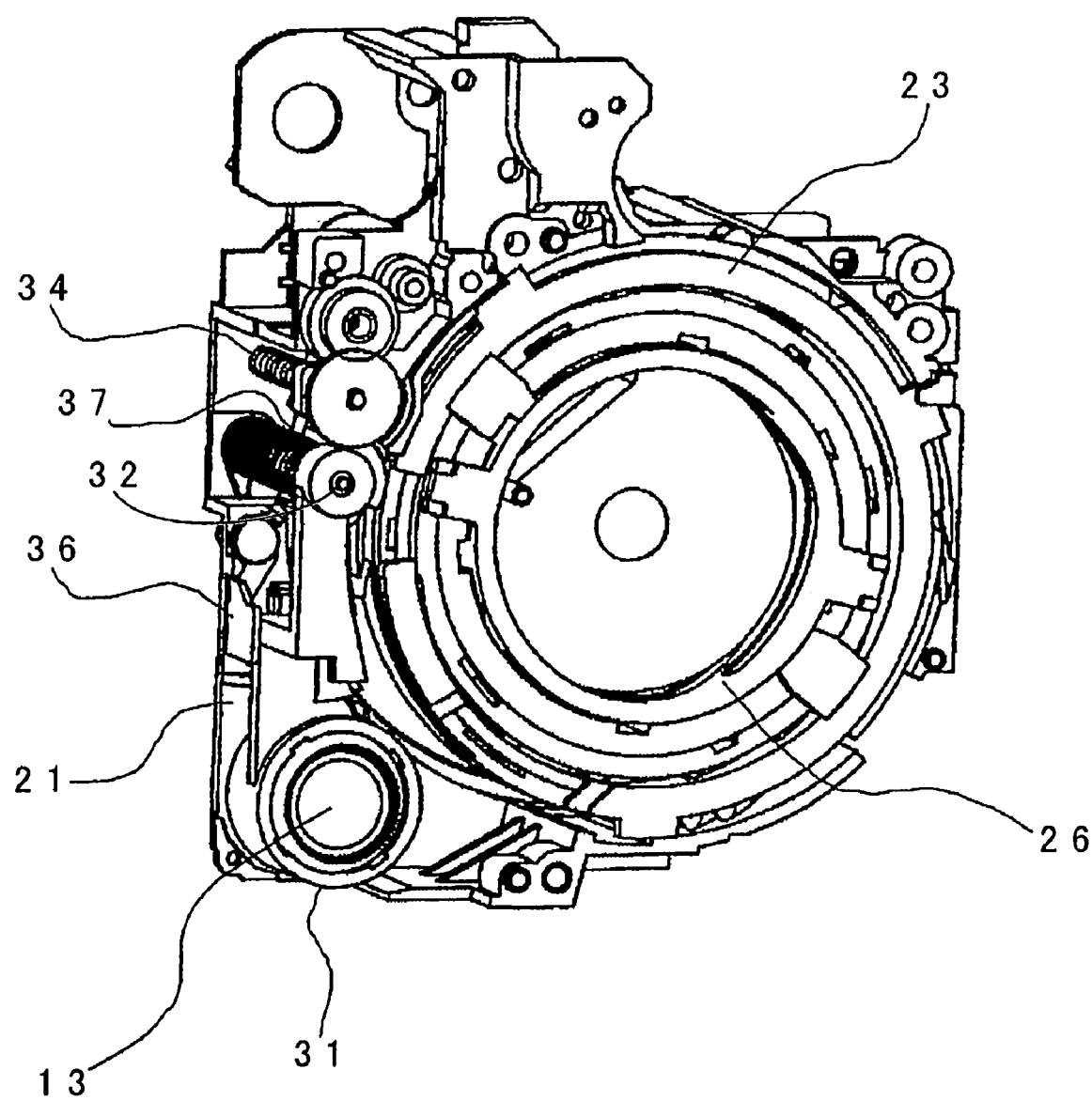
FIG. 2 is a schematic perspective view illustrating the main part of the lens barrel illustrated in FIG. 1, as viewed from an imaging plane.
Figure 8:
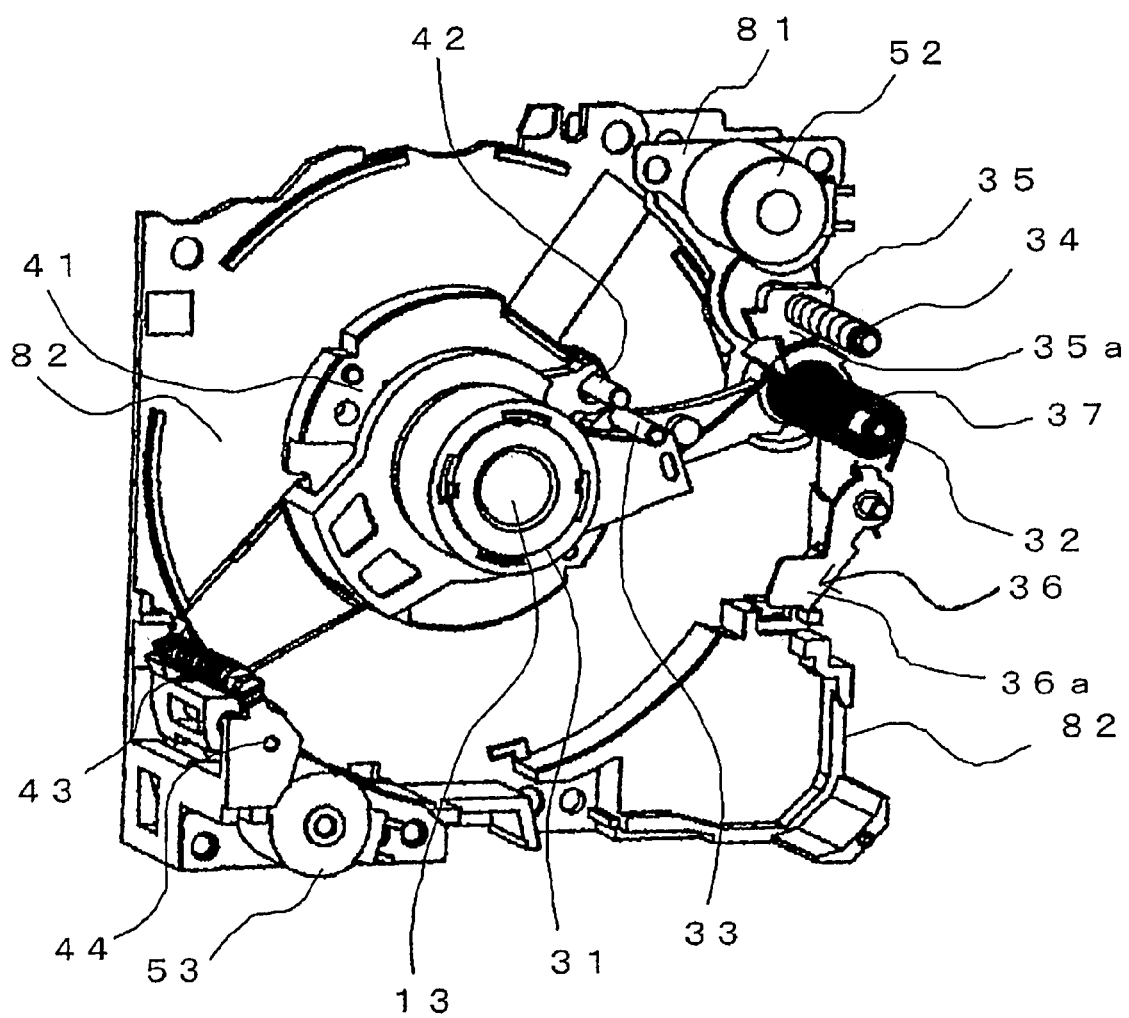
FIG. 8 is a schematic perspective view of a layout of the third frame, the impact preventing member, and the fourth frame for explaining operations of the third frame, which retains the third lens group, and the impact-preventing member in the photographing state with the lens groups projected, as viewed from the object.
Figure 16:
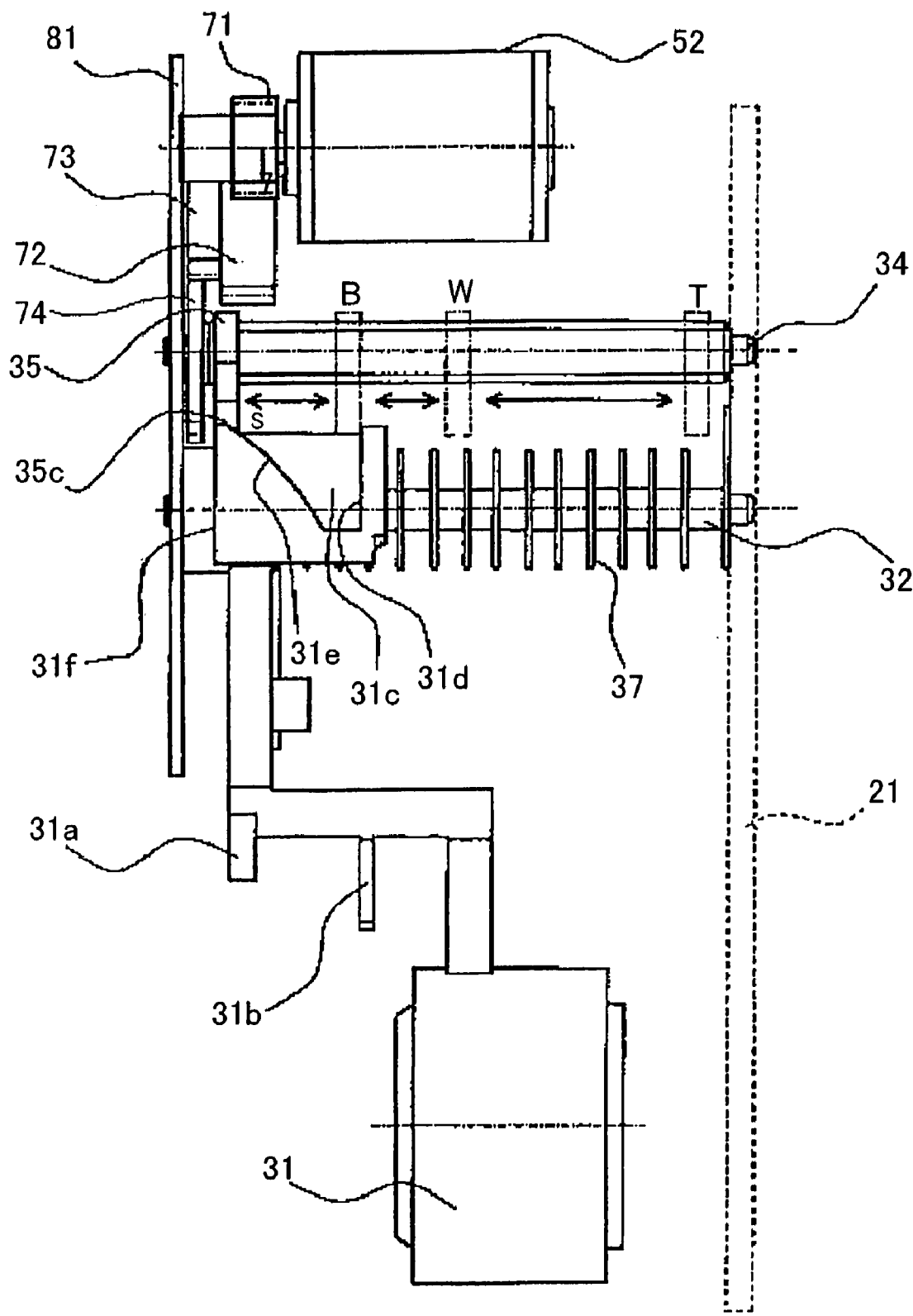
FIG. 16 is a schematic side view illustrating the third frame and a structure of its drive system.
Figure 17:
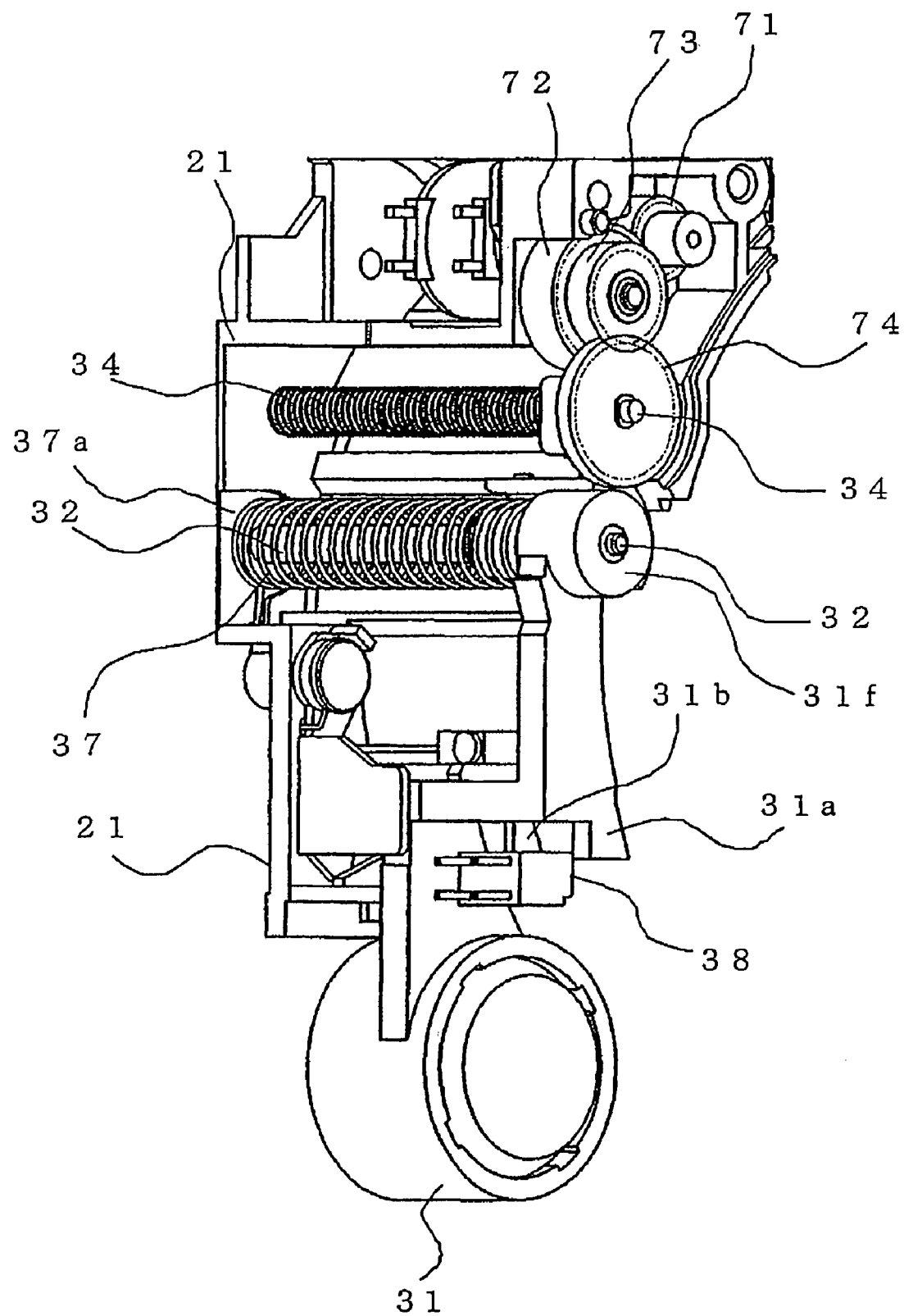
FIG. 17 is a schematic perspective view of FIG. 16.

As described above, the retractable third lens group 13 is retained to the third frame 31, as illustrated in FIGS. 16 and 17. The third frame 31 retains the third lens group 13 at one end thereof, and the other end of the third frame 31 is supported by a third group main-guide shaft 32 which extends substantially in parallel with the optical axis of the third lens group 13 so as to be capable of rotating, and sliding along the third group main-guide shaft 32. The third frame 31 is rotatable about the third group main-guide shaft 32 between a setting position in which the third lens group 13 is disposed onto the optical axis in a photographing state, as illustrated in FIG. 8 and the retracted position in which the third lens group 13 is retracted out of the telescopic cylinder or retracted out of the fixed cylinder 21a into the fixed frame 21 in a retracted state, as illustrated in FIG. 2.

In the vicinity of the third lens group 13 on the side of the rotating end of the third frame 31, a crank-shaped bent portion for differentiating the position of the third lens group 13 in the direction parallel with the main guide shaft between the side of the rotation axis and the side of the supporting portion, a stopper 31a (FIGS. 16 to 18) and a light-shielding member 31b are provided on the rotating end to project from the bent portion substantially toward the rotating end.

On the optical performance, in order to lengthen a focus length in the telephoto state, a position of the third lens group 13 in the telephoto state is in an extended position closer to the object. However, a possible moving amount of the third frame 31 is determined by limitation of a length of the lens barrel in the collapsed state along the optical axis X. It is possible to maximize the focus length in the telephoto state by setting a position for retaining the third lens group by the third frame 31 in the closest position to the object. However, if a position of the stopper 31a along the optical axis sets on the generally same position as the third lens group 13, a length of a third frame sub-guide shaft 33 is longer and a size of the lens barrel in the collapsed state becomes greater. Therefore, it is required that the stopper 31a is set on a side of a focusing position and the third frame 31 is formed into a shape having the crank-shaped bent portion.

Meanwhile, the third frame 31 may be formed from two parts and in this case, one is a member having the crank-shaped bent portion, and the other is a member for retaining the third lens group 13. The two parts operates integrally by being fixed together.

The third lens group 13 is retracted out of the optical axis X in the collapsed position, in which the lens groups are collapsed in the fixed frame 21, as illustrated in FIG. 9A. The third lens group 13 is moved onto the optical axis X in an extended position of the lens groups. In the present preferred embodiment, when the third lens group 13 retracts outside from the fixed cylinder 21a, the third lens group 13 passes through the cutout portion provided in a wall of the fixed cylinder 21a. Although the cutout portion is provided in the wall of the fixed cylinder 21a in the present preferred embodiment, when the fixed cylinder 21a is structured by the beams as described above, a space formed between such beams is equivalent to the cutout portion in a broad sense. In addition, the cutout portion of the fixed cylinder 21a may be a window-like cutout portion in which an end in the image plane side is not open and a cylindrical wall is closed. Moreover, the third frame 31 does not necessarily have to be completely outside from the fixed frame 21 in the collapsed position in which the third lens group 13 is retracted. For example, the third frame 31 may be set to be in a state in which the third frame 31 does not interfere with storage of other lens frames in the collapsed position.

As illustrated in FIGS. 16 and 17, a third frame female screw member 35 screwed on a third group lead screw 34 is positioned in the closest position to an image plane of the CCD in the retracted state in which the third frame 31 is retracted. In this state, as illustrated in FIG. 16, a compression torsion spring 37 is charged or compressed fully so as to impart constantly a clockwise moment (a direction entering toward the optical axis) to the third frame 31 as viewed from the front of the lens barrel, and also so as to press the third frame 31 toward a retainer plate 81.

A cylindrical outer peripheral surface of a support part 31g provided on the main-guide shaft 32 for the third frame 31 is provided with a stepped portion 31c, and a cam portion 31e disposed inside the stepped portion 31c and formed in an inclined surface, as illustrated in FIG. 16.

From this state, when a third frame drive motor 52 is rotated clockwise as viewed from the front of the lens barrel, the third group lead screw 34 is rotated clockwise through a gear mechanism including gears 71 to 74, and the third frame female screw member 35 moves toward the object along the optical axis X. At this time, the third frame 31 is rotated clockwise by the moment force of the compression torsion spring 37, and the cam portion 31e engages with a first abutting portion 35a provided on the third frame female screw member 35. Because of the twisting force of the compression torsion spring 37, the cam portion 31e constantly contacts with the first abutting portion 35a of the third frame female screw member 35.

Thereafter, when the third frame female screw member 35 is moved in the closest position to the object by the rotation of the lead screw 34, the light-shielding member 31b of the third frame 31 is moved to a position out of the photo-interrupter 38 as a device for detecting a position of the third lens group 13, thereby the photo-interrupter 38 generates a reference signal in a range from L (or a low) level to H (or a high) level. Accordingly, a position of the third lens group 13 is controlled by pulse count based on the reference signal from the photo-interrupter 38.

Figure 19:
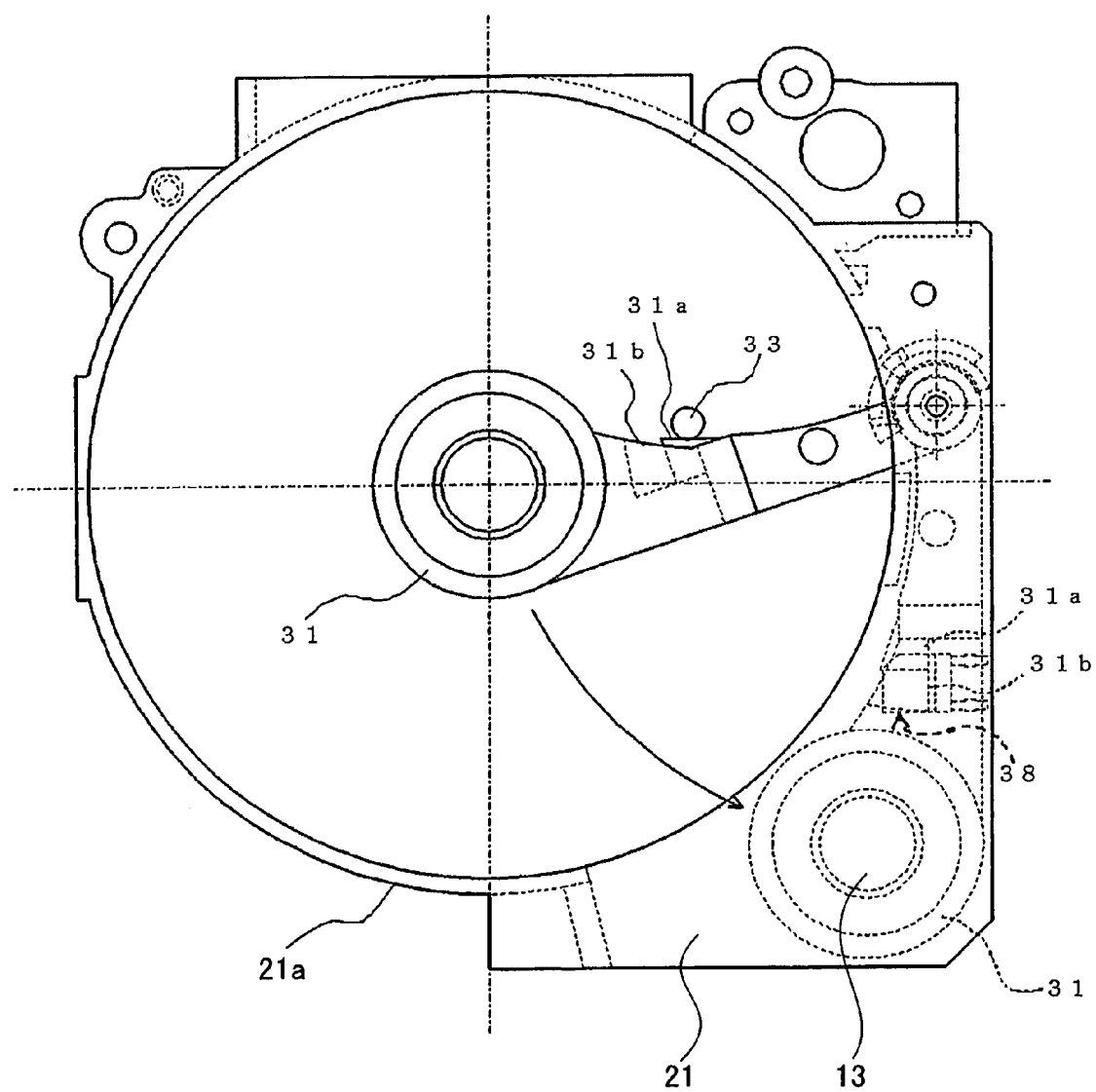
FIG. 19 is a schematic back view of the third frame part for explaining operation of the third frame, as viewed from the image plane side.
Figure 20:
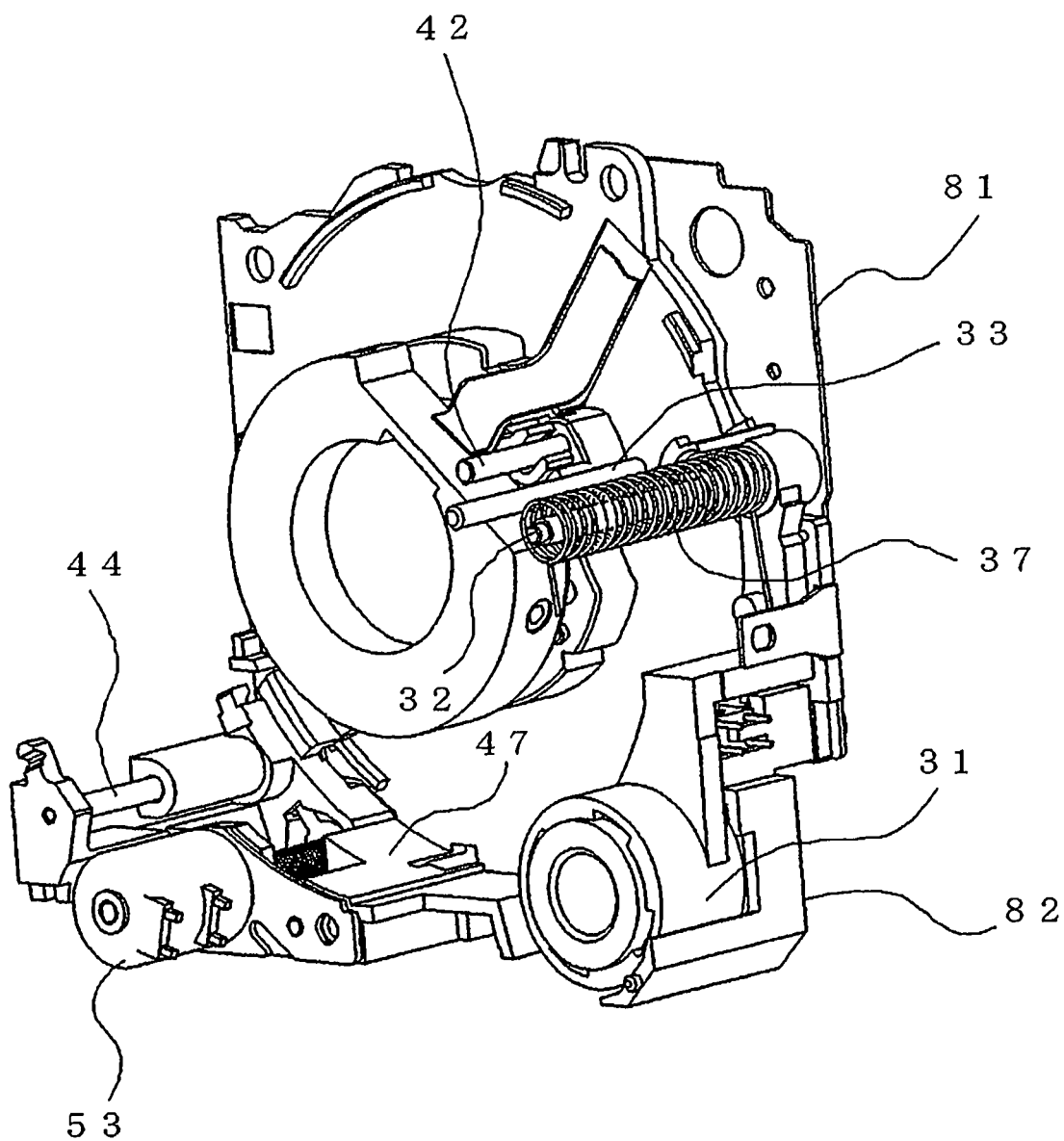
FIG. 20 is a schematic perspective view for explaining the operation of the third frame, mainly illustrating a shutter release part.

From this state, when the third frame female screw member 35 is moved to a retract-initiating position B of the third frame 31, as illustrated in FIG. 16, the third frame 31 further rotates clockwise, and the stopper 31a comes into abutment with the third frame sub-guide shaft 33 as illustrated in FIGS. 8 and 19. As a result, a position of the third frame 31 on the optical axis is determined. Consequently, approach operation of the third lens group 13 to the optical axis is completed. In the retract-initiating position B, the third frame 31 is movable toward the retracted position S.

Meanwhile, the light-shielding member 31b shields the photo-interrupter 38 illustrated in FIG. 19 so that it is possible to detect and confirm that the third frame 31 is in the retracted position S or the retract-initiating position B. When the third frame female screw member 35 is moved to the retract-initiating position B illustrated in FIG. 16, the first abutting portion 35a of the third frame female screw member 35 contacts with the front engaging portion 31d of the stepped portion 31c of the third frame 31. Again, the stepped portion 31c of the third frame 31 has the cam portion 31e which forms a slanted shape on a base end side and the front engaging portion 31d which forms a planner surface generally perpendicular to the third group main guide shaft 32 on a front end side thereof.

The third frame 31 is constantly biased to move to a direction transverse to the optical axis, i.e., from the retracted position to the optical axis as well as to a direction along optical axis, i.e., from the object to a retainer plate 81 beside the image plane by the compression torsion spring 37 provided on the third group main-guide shaft 32.

In addition, a portion of the fixed frame 21 to which the compression torsion spring 37 contacts includes a step 37a which is formed as a concave portion for inserting one end of the compression torsion spring 37 as illustrated in FIG. 17, to prevent the compression torsion spring 37 from deviating out of a center of the third group main-guide shaft 32 considerably.

Next, when the third frame female screw member 35 is moved to a short focal length/wide angle position (the wide angle position W illustrated in FIG. 16), because the first abutting portion 35a of the third frame female screw member 35 presses the front engaging portion 31d, the third frame 31 is movable to the wide angle position along the optical axis X toward the object.

Moreover, while the third frame female screw member 35 is disposed between the retract-initiating position B and the telephoto position T as illustrated in FIG. 16, because the third frame 31 is constantly pressed along the optical axis toward the image plane by the compression torsion spring 37, all spaces generated among the third group lead screw 34, the third frame female screw member 35 and the retainer plate 81 are directed to the image plane, so that the third frame 31 can secure a positional accuracy in the direction of the optical axis.

The third frame female screw member 35 is screwed on the third group lead screw 34 disposed substantially in parallel with the optical axis. The third frame female screw member 35 includes the rotation-preventing projection 35b in addition to the first abutting portion 35a (FIG. 18), which engages with the above-described front engaging portion 31d or the cam portion 31e of the third frame 31.

Figure 18:
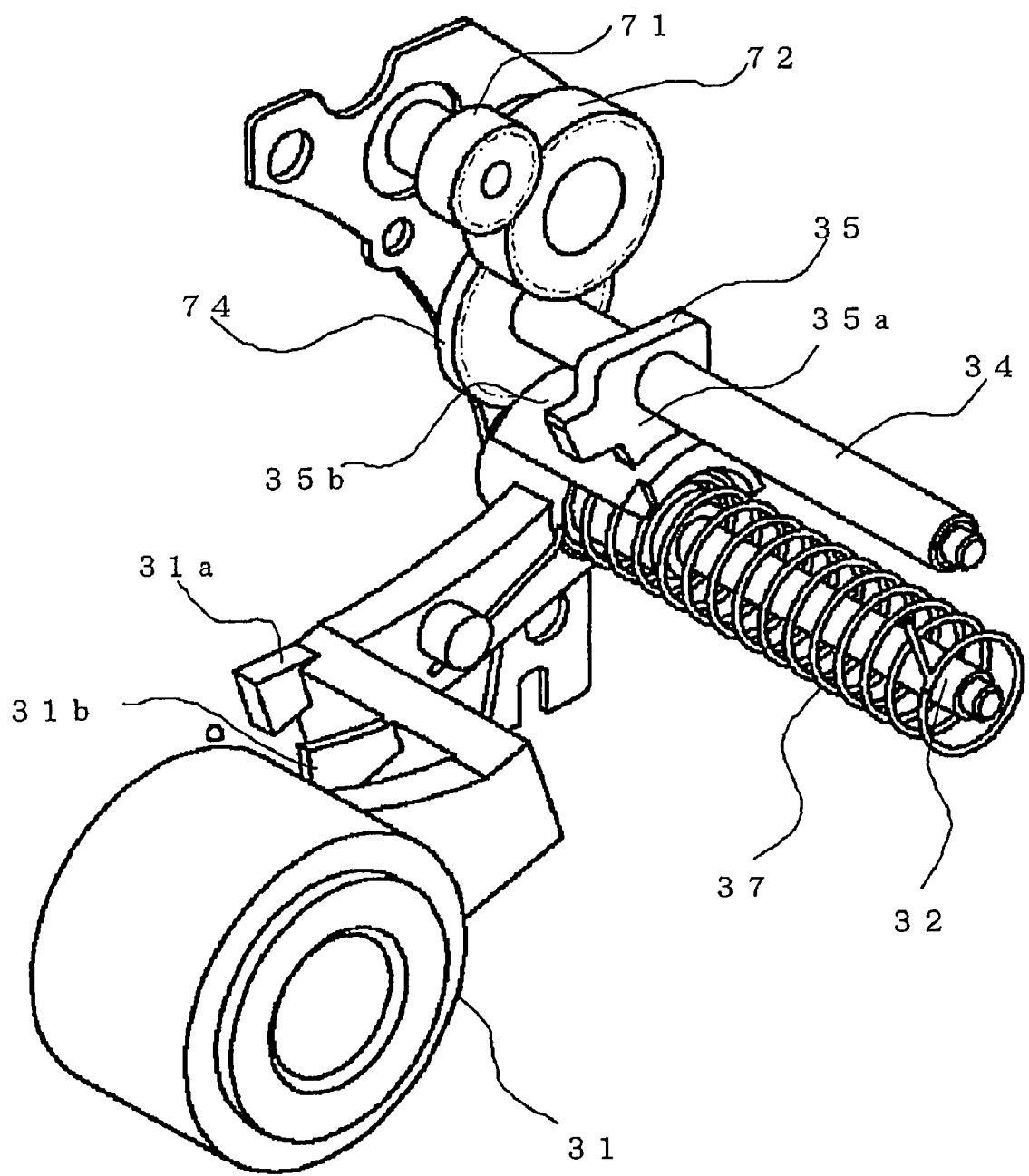
FIG. 18 is a schematic perspective view showing the third frame and the structure of its drive system.

The rotation-preventing projection 35b is fitted slidably into the guide groove formed on the cylindrical part of the fixed frame 21 in parallel with the optical axis as a rotation-preventing device for preventing the third frame female screw member 35 from rotating along with the rotation of the third lead screw 34, as illustrated in FIG. 18. In other words, the third frame female screw member 35 is moved in the back and forth directions along the optical axis by the rotation of the third lead screw 34, because the third frame female screw member 35 is prevented from rotating by the rotation-preventing projection 35b fitting into the guide groove of the fixed frame 21.

As illustrated in FIG. 16 in detail, when the third frame female screw member 35 is moved further toward the image plane (left side in the drawing) from the retract-initiating position B illustrated in FIG. 16, the third frame female screw member 35 engages with the cam portion 31e of the stepped portion 31c of the third lens group-retaining frame 31. The third frame 31 comes into contact with the retainer plate 81 by the biasing force of the compression torsion spring 37 toward the optical axis direction, and the third frame 31 is rotated counterclockwise against the clockwise biasing force exerted by the compression torsion spring 37. Therefore, it is possible to retract the third frame 31.

On the other hand, while the third frame female screw member 35 is moved from the telephoto position T through the wide angle position W to the retract-initiating position B by the reverse rotation or counterclockwise rotation of the third group lead screw 34, because the first abutting portion 35a of the third frame female screw member 35 engages with the front engaging portion 31d of the stepped portion 31c of the third frame 31, the third frame 31 moves gradually to direct from the object to the image plane while maintaining the position on the optical axis restricted by the third frame sub-guide shaft 33 by the biasing force toward the optical axis and the biasing force toward the image plane.

Meanwhile, when the third frame female screw member 35 reaches the retract-initiating position B, a base end surface 31f contacts with the retainer plate 81, and the third frame female screw member 35 is disposed with an interval from the front engaging portion 31d, and contacts with the cam portion 31e of the stepped portion 31c.

While the third frame female screw member 35 moves from the retract-initiating position B to the collapsed position S, a second abutting portion 35c of the third frame female screw member 35 comes into sliding contact with the cam portion 31e of the stepped portion 31c of the third frame 31 and rotates the third frame 31 against the rotational biasing force exerted by the compression torsion spring 37, whereby the third frame 31 moves from the position on the optical axis to the collapsed position S. The collapsed position S of the third frame 31 corresponds to a position at which it is moved toward the image plane by a predetermined pulse count number after the generation of the reference signal of the range from the H to the L generated from the photo-interrupter 38. After the third frame 31 is moved to the collapsed position S, the first lens group 11, the second lens group 12, and the shutter/aperture unit 15 are moved to the collapsed position.

In the present preferred embodiment, before the third frame 31 is moved to the collapsed position S, a fourth frame 41 for retaining the fourth lens group 14 is first moved to the collapsed position. A first collapsed position of the fourth frame 41 corresponds to a position at which it is moved toward the image plane by a predetermined pulse count number after the generation of a storage reference signal of a range from the H to the L generated by a fourth group reference detector (fourth group photo-interrupter 47). After the fourth frame 41 reaches the first collapsed position, the stored operation of the third frame 31 is initiated.

That is to say, the third frame female screw member 35 moves toward the image plane by a predetermined pulse count number from the generation of the stored reference signal from the H to the L by the photo-interrupter 38 (see FIG. 19), and the stored operation of the third frame 31 completes. After the completion of the stored operation of the third frame 31, the first rotary cylinder 22 and structural parts disposed inside the first rotary cylinder 22 and the first liner 23 and so on are stored before contacting with the third frame 31. This results in the storage of the first rotary cylinder 22 and so on without interfering with the third frame 31.

Positions of the first rotary cylinder 22 and so on can be set by a drive pulse count generated by a zoom count detector comprising a pinion gear attached directly to an output shaft of the zooming motor 51 and having an encoder structure and a photo-interrupter 51a (FIG. 1) disposed adjacent the pinion gear, for example.

Meanwhile, although the DC motor is used as the drive source for moving the first rotary cylinder 22 and the drive position of the first rotary cylinder 22 is detected by the detector comprising the encoder and the photo-interrupter, in the above-mentioned embodiment, the similar function can be accomplished by substituting a pulse motor structure for the whole of the above-mentioned structure.

Figure 7:
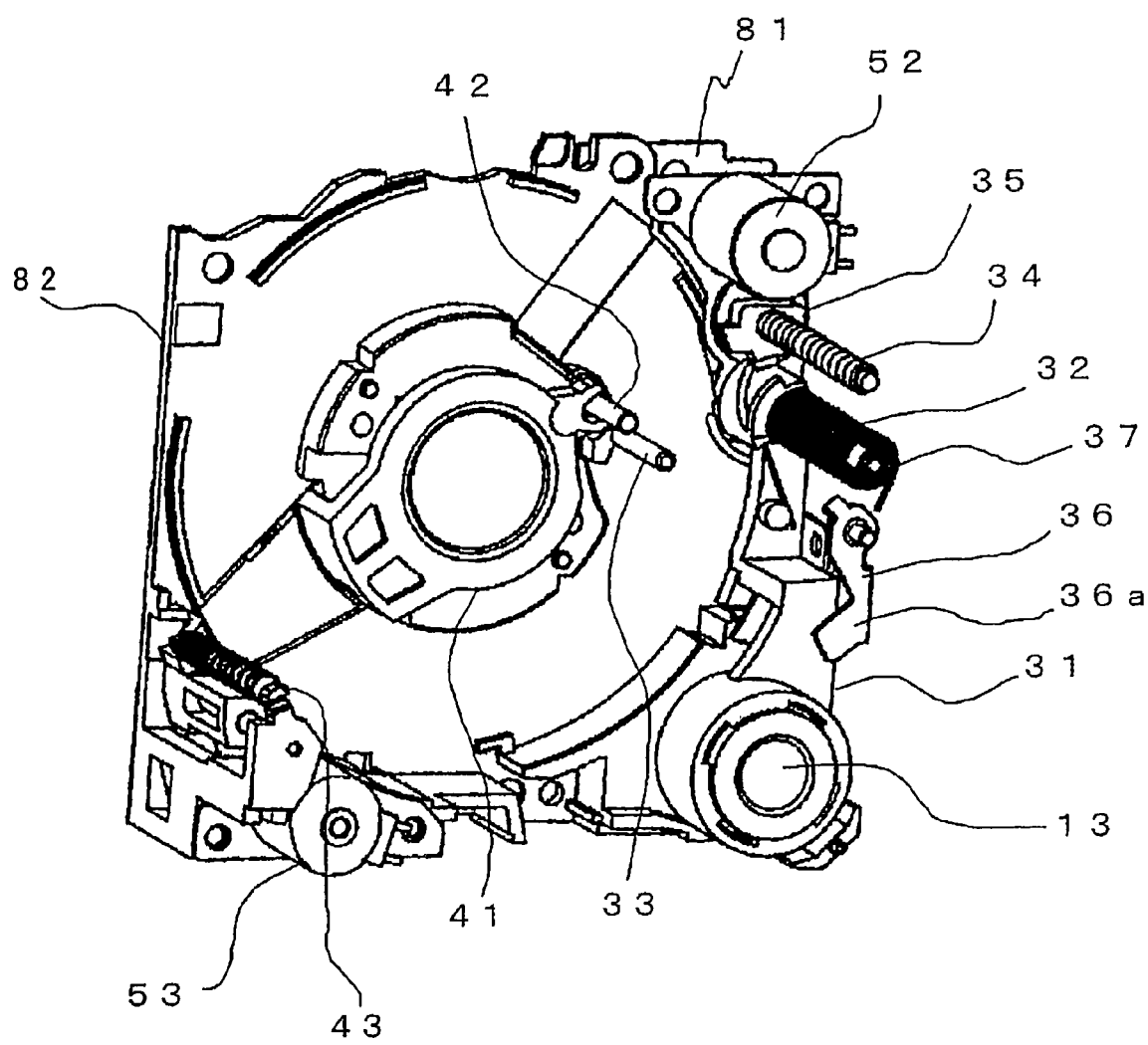
FIG. 7 is a schematic perspective view of a layout of a third frame, an impact preventing member, and a fourth frame in a state in which the lens groups are in a collapsed position, for explaining operations of the third frame which retains the third lens group and the impact preventing member, as viewed from the object.

To prevent the third frame 31 from collision with the other parts, an impact-preventing member 36 is, as illustrated in particular in FIGS. 2 and 7, rotatably supported on the fixed frame 21 in the vicinity of the third group main-guide shaft 32, and includes a rotated portion provided at one end of the impact-preventing member 36 and an engaging projection 36a. The impact-preventing member 36 is constantly biased to cause the engaging projection 36a to move toward the optical axis X by a spring or the like.

When the third frame 31 is positioned in the collapsed position, the impact-preventing member 36 is pushed out by rotating force of the third frame 31 against biasing force of the spring, and is deviated outside the third frame 31.

Figure 5:
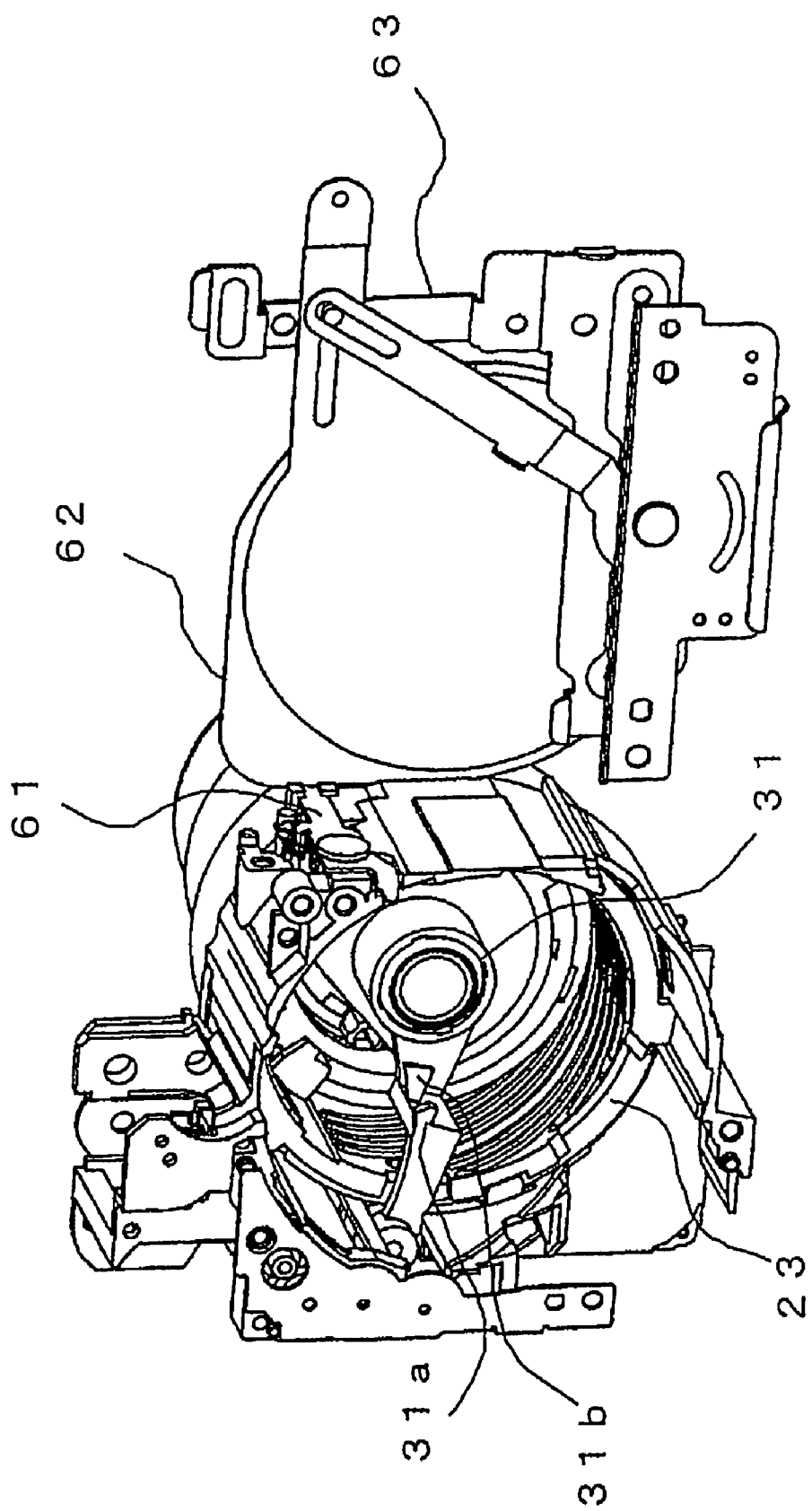
FIG. 5 is a schematic perspective view of the structure of the main part of the lens barrel in a state in which the lens barrier is opened in a photographing state with the lens groups extended, as viewed from the imaging plane.
Figure 6:
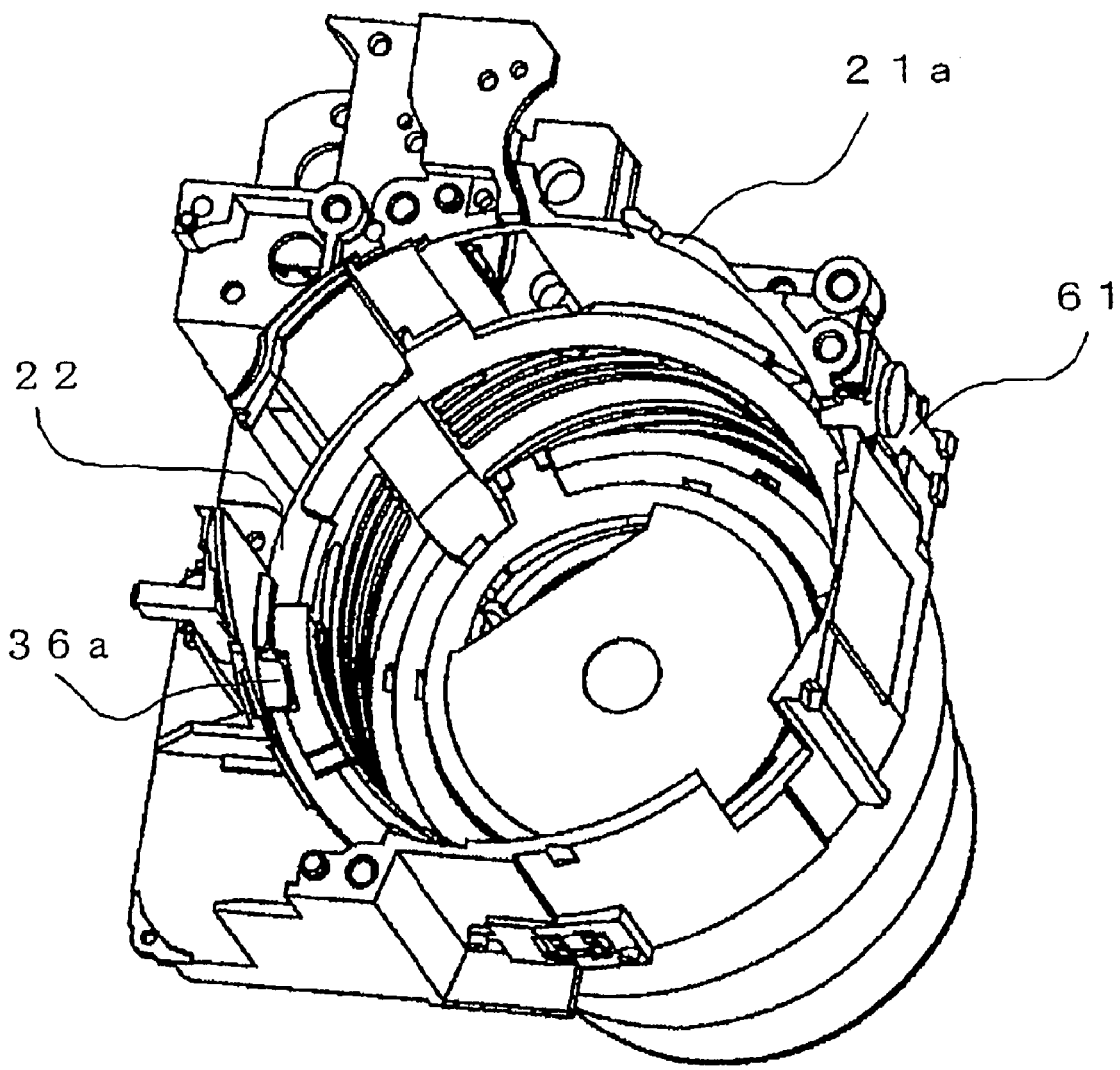
FIG. 6 is a schematic perspective view of the structure of the main part of the lens barrel in the photographing state with the lens groups extended, as viewed from the imaging plane.

When the third frame 31 is rotated and positioned on the optical axis, the impact-preventing member 36 is released from engagement with the third frame 31, and is rotated to cause the engaging projection 36a to be projected toward the photographing optical axis X by the biasing force, thereby causing the engaging projection 36a to project from the inner surface of the fixed cylinder 21a of the fixed frame 21 (FIG. 6). At this time, in addition to the first rotary cylinder 22 and the first liner 23, the second rotary cylinder 24, the second liner 25, the cam cylinder 26 and the lineally-moving cylinder 27 are all positioned on the object side with respect to the projected position of the engaging projection 36a. Therefore, the engaging projection 36a is positioned to project inwardly of an outer peripheral edge of the base portion of each of the first rotary cylinder 22 and the first liner 23 (see FIG. 5, FIG. 6, and FIG. 8 in particular).

With such a structure, even if an operator tries to manually rotate the first rotary cylinder 22 forcibly so as to move it to the collapsed position, the impact-preventing member 36 first contacts with the first rotary cylinder 22. Therefore, because the base portion of the first rotary cylinder 22 cannot be moved toward the image plane than the position of the impact-preventing member 36 along the optical axis X, the first rotary cylinder 22 is prevented from contacting with the third frame 31. Accordingly, it is possible to accomplish the prevention of breaking, damage or the like of the third frame 31 due to strong external force. Here, the first rotary cylinder 22 can be moved to the collapsed position only after the third frame 31 is moved to the collapsed position correctly.

Therefore, in a state of being used or in the photographing state of the lens barrel, in which the movable cylinders such as the first rotary cylinder 22 and so on are extended, when a great pressure is exerted on a leading end of the lens barrel and so on by a drop of the lens barrel or the like, the engaging projection 36a of the impact-preventing member 36 engages with the first rotary cylinder 22 and the first liner 23, and hence further retraction of the first rotary cylinder 22 and the first liner 23 (as well as the second rotary cylinder 24, the second liner 25, the cam cylinder 26, and the lineally-moving cylinder 27) toward the third lens group 13 is prevented. Accordingly, the third frame 31 and the third lens group 13 are prevented from being damaged.

The third group lead screw 34 is rotated in forward and reverse directions by a third frame drive motor 52. The rotation of the third frame drive motor 52 is transmitted to the third group lead screw 34 via gears 71, 72, 73, and 74 arranged in sequence.

Figure 21:
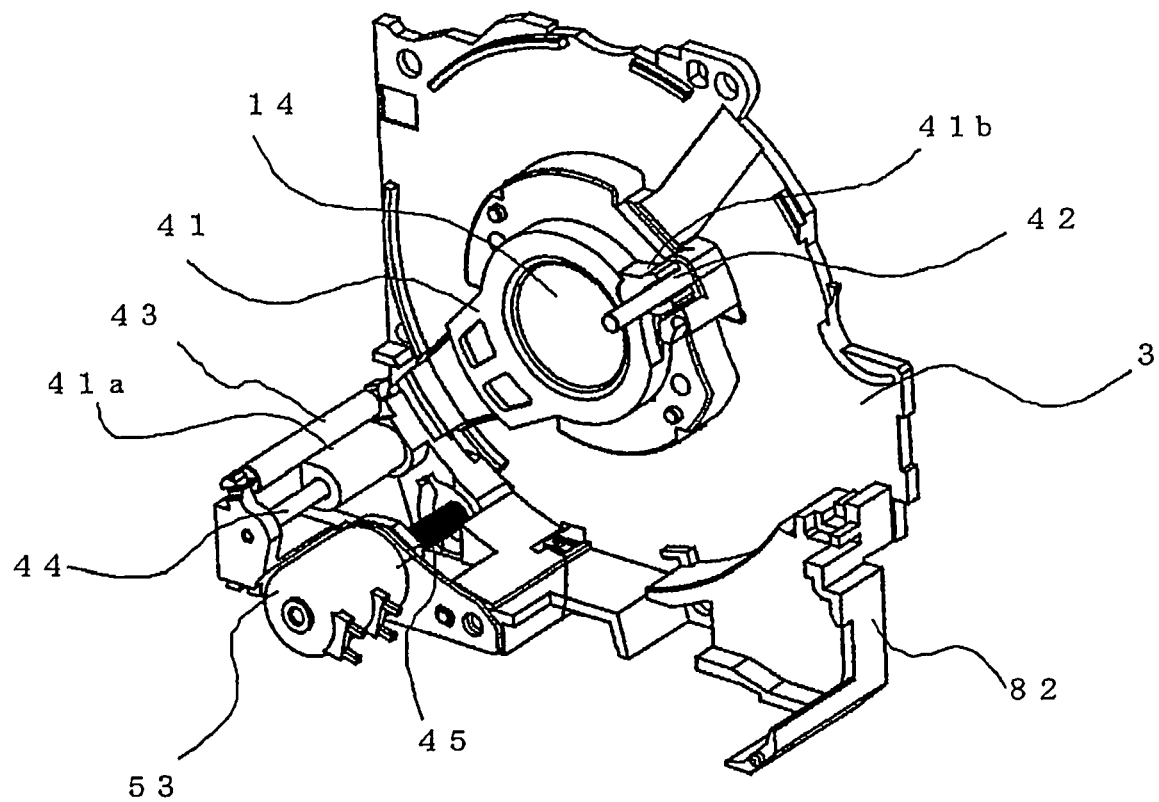
FIG. 21 is a schematic perspective view illustrating a fourth frame and a structure of parts relating to its drive system.

Next, a drive structure of the fourth lens group 14 is described with reference to FIGS. 7 and 8. Note that each FIG. 21 and FIG. 22 is a perspective view mainly showing a drive system of the fourth lens group 14.

Figure 22:
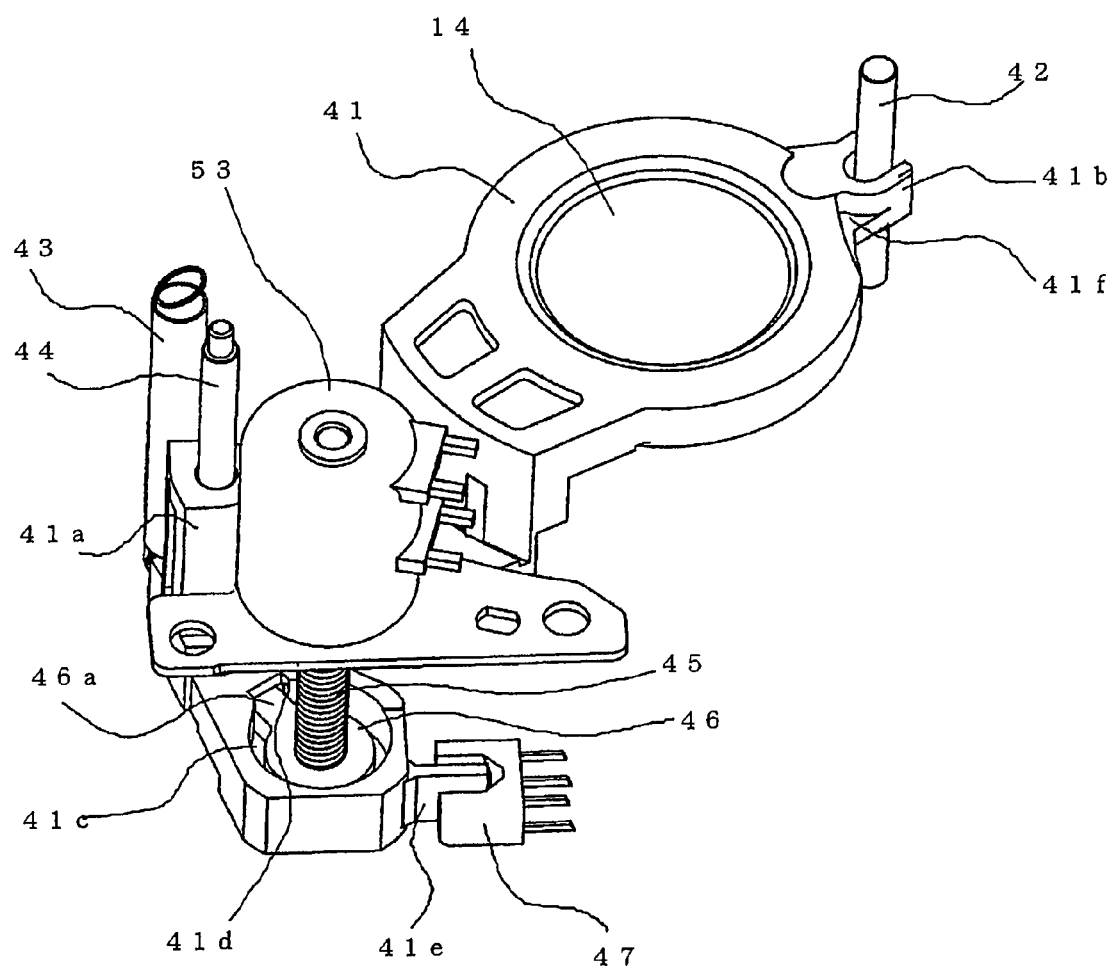
FIG. 22 is a schematic perspective view illustrating the fourth frame and a main part of its drive system, as viewed from an angle different from FIG. 21.

The fourth lens group 14 used as a focusing lens for focusing the lens groups in the illustrated embodiment is retained by the fourth frame 41, as illustrated in FIG. 22. The fourth frame 41 includes a sleeve portion 41a in which a fourth frame main-guide shaft 44 disposed in parallel with the optical axis X and fixed to a lens barrel base 82 is fitted, and a rotation-preventing portion 41b in which a fourth frame sub-guide shaft 42 disposed in parallel with the optical axis X and fixed to the lens barrel base 82 is fitted, to restrict the rotation of the fourth frame 41. With such a structure, the fourth frame 41 can be moved freely along the fourth frame main-guide shaft 44, i.e. the optical axis X. A fourth frame drive motor 53 comprising a stepping motor is used as a drive source for driving the fourth frame 41 in the illustrated embodiment. Provided on an output shaft of the fourth frame drive motor 53 is a fourth frame lead screw 45 which is threaded into a threaded hole provided in a fourth frame female screw member 46.

The fourth frame 41 has an opening for inserting the fourth frame female screw member 46. The opening has an engaging portion 41c for engaging with the fourth frame female screw member 46 in a perpendicular plane to the optical axis X in a side of the image plane. The fourth frame 41 is always engaged with the fourth frame female screw member 46 by allowing the fourth frame 41 to bias toward the object by a fourth frame spring 43.

The fourth frame female screw member 46 has a radially projected protrusion 46a. The protrusion 46a is engaged in a bore 41d provided in one side of the opening for inserting the fourth frame female screw member 46 of the fourth frame 41 so that the rotation of the fourth frame female screw member 46 is stopped.

In this way, when the fourth frame drive motor 53 which is the stepping motor for example is driven, the fourth frame lead screw 45 rotates, and hence, the fourth frame female screw member 46 is moved in the forward and reverse directions along an axis of the fourth frame lead screw 45 (i.e. the optical axis X). Because the fourth frame 41 engages with the fourth frame female screw member 46, the fourth frame 41 is moved along the optical axis X following to the movement of the fourth frame female screw member 46. In this case, although the fourth frame lead screw 45 is formed on the output shaft of the fourth frame drive motor 53, the fourth frame lead screw 45 may be rotated by structuring the fourth frame drive motor 53 and the fourth frame lead screw 45 separately and connecting them through gears or the like.

The fourth frame 41 is provided with a light-shielding piece 41e which shields an optical passage of a fourth group photo-interrupter 47 provided on the lens barrel base 82. The light-shielding piece 41e is capable of light-shielding or passing light through the optical passage of the fourth group photo-interrupter 47 in response to the movement of the fourth frame 41. In this case, the fourth frame 41 can be moved in a predetermined position by recognizing as a reference position a time at which the light-shielding pieces is set from the light-shielding state to the light-passing state and energizing a pulse waveform of any pulse number from the reference position to rotate the fourth frame drive motor 53.

Meanwhile, the fourth frame 41 has a concave portion 41f which is provided in an outer peripheral edge thereof and allows the light-shielding member 31b of the third frame 31 for the photo-interrupter 38 to move toward the optical axis X to avoid the interference with the fourth frame 41, thereby the movement amount of the fourth frame 41 can be increased and a range capable of focusing can be enlarged. Moreover, as described above, there is a clearance between the fourth frame 41 and the fourth frame female screw member 46 in the direction of the optical axis X, but the position in the direction of the optical axis X of the fourth frame 41 can be controlled accurately by constantly biasing the fourth frame 41 toward the object by the fourth frame spring 43.

The collapsed position of the first rotary cylinder 22, the first liner 23, the first lens group 11, the second lens group 12, and the shutter/aperture unit 15 is controlled based on the zoom position-reference signal generated by the zoom position detector comprising the photo-reflector and so on disposed in the fixed frame 21. That is to say, it is possible to complete the storing operation by moving them toward the image plane by the predetermined pulse count number of the drive pulse generated by the pinion gear acting as the encoder and the zoom count detector disposed adjacent to the pinion gear after the change of from the H to the L of the zoom position storage reference signal occurs.

In storing, the fourth frame 41 is positioned in the first collapsed position as described above, while, when the first rotary cylinder 22 is moved to the collapsed position, the most distal surface of the first rotary cylinder 22 or the first liner 23 contacts with the fourth frame 41 and presses the fourth frame 41 to move to the second collapsed position finally.

By such an operation, even if variations of the attached position of the fourth group photo-interrupter 47 in the direction of the optical axis X occur, the fourth frame 41 can be moved to the collapsed position accurately without requiring a complicated adjustment. Such an operation can be accomplished for the reason that a length of the engaging space formed in the fourth frame 41, in the direction of the optical axis X is larger than a thickness of the fourth frame female screw member 46.

Figure 26:
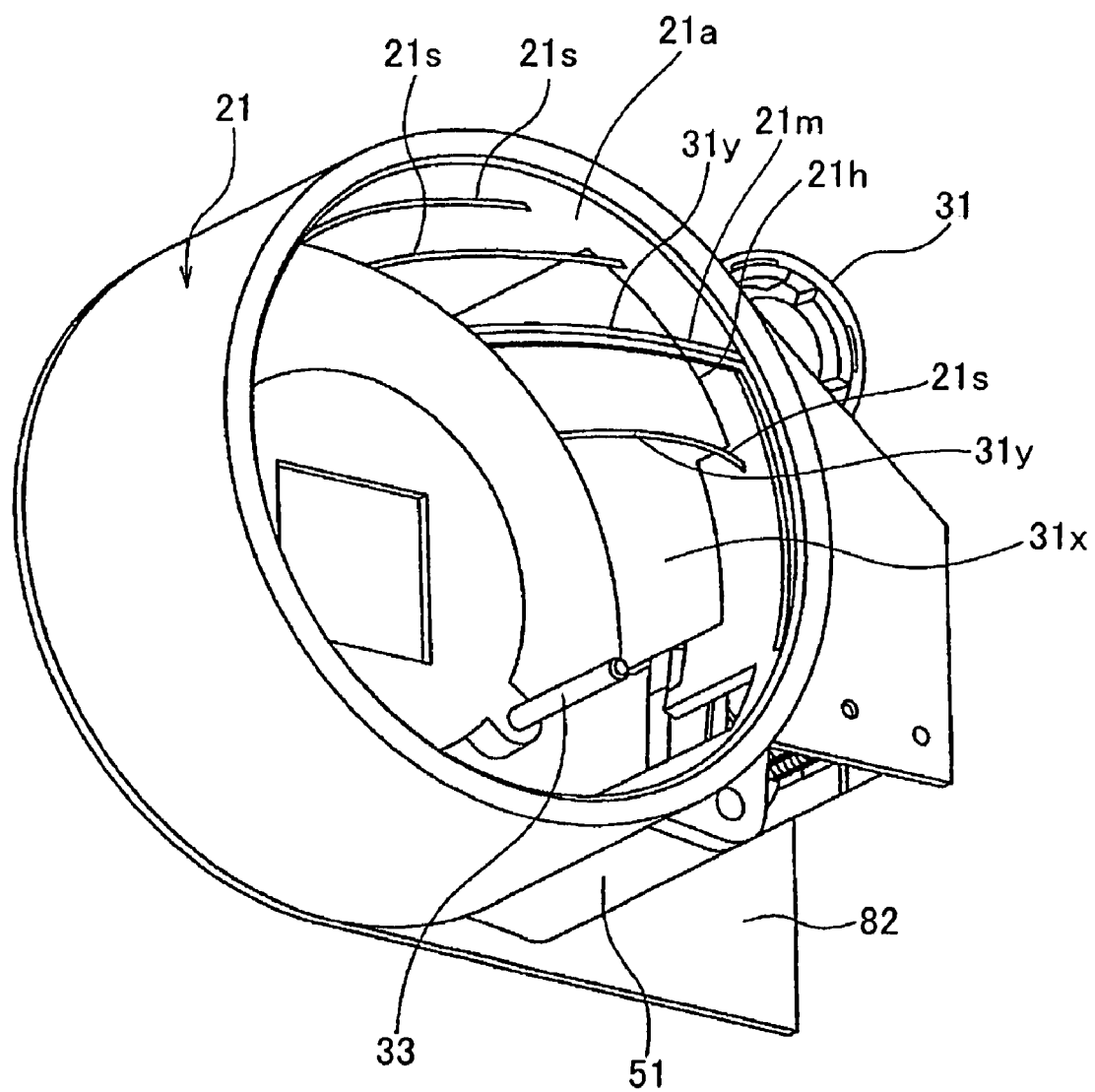
FIG. 26 is a perspective view schematically illustrating the fixed frame and a structure of the third frame part including a lid plate in the lens barrel according to a third preferred embodiment of the invention.

The zooming motor 51 for moving the first lens group 11, the second lens group 12, and the shutter/aperture unit 15 is structured by the DC motor for example as described above in the illustrated embodiment. The third frame drive motor 52 for driving the third lens group 13 and the fourth frame drive motor 53 for driving the fourth lens group 14 are generally configured to use a pulse motor for example (FIGS. 1 and 26). The zooming motor 51, the third frame drive motor 52 and the fourth frame drive motor 53 are driven in conjunction with each other in a software-like manner to achieve an appropriate zooming action performed mainly by the first to the third lens groups 11-13 and an appropriate focusing action performed mainly by the fourth lens group 14, for example.

Figure 3:
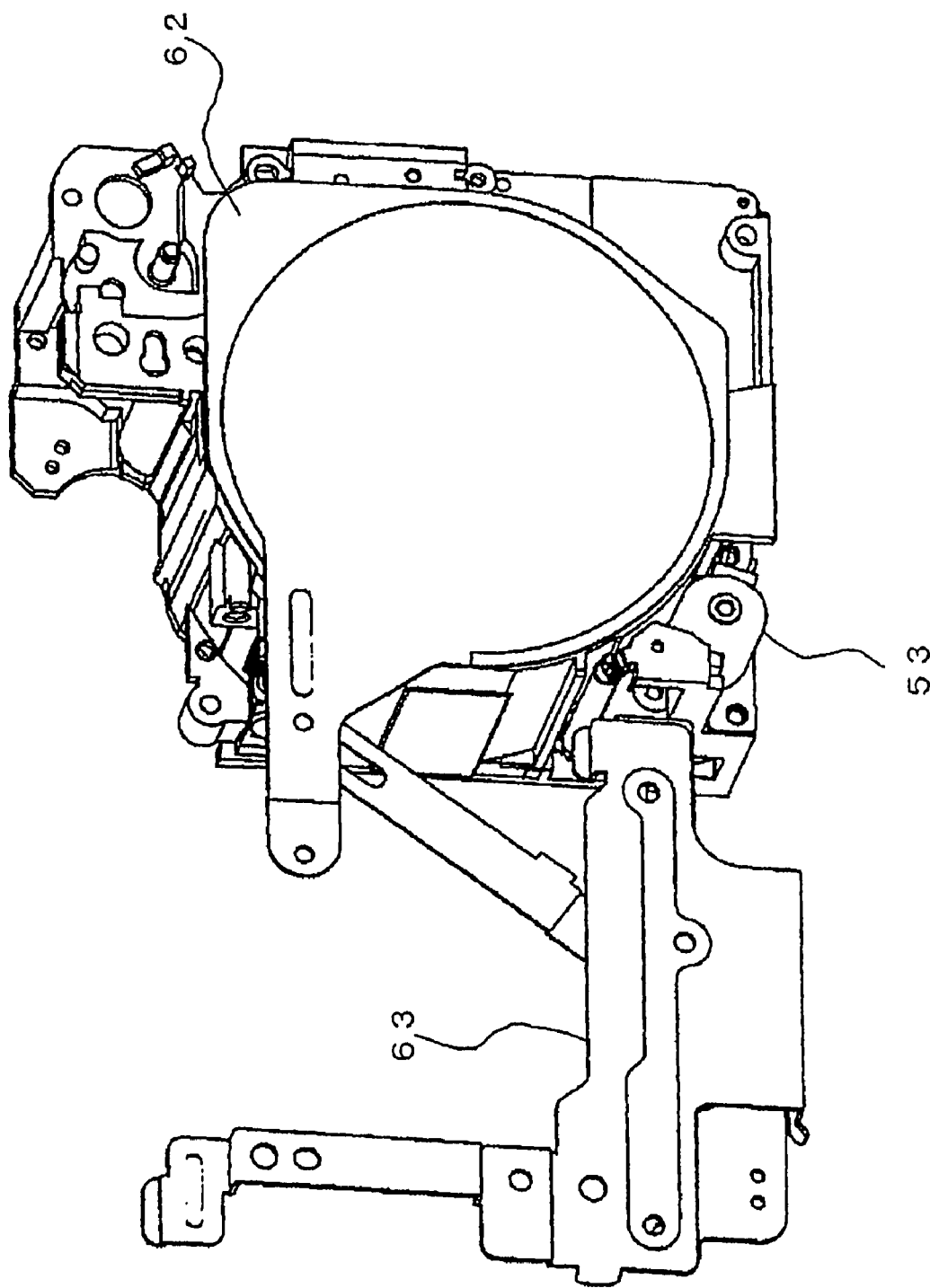
FIG. 3 is a schematic perspective view illustrating a structure of a main part of the optical system device including the lens barrel in which a lens barrier is closed with the lens groups collapsed, as viewed from the object.
Figure 4:
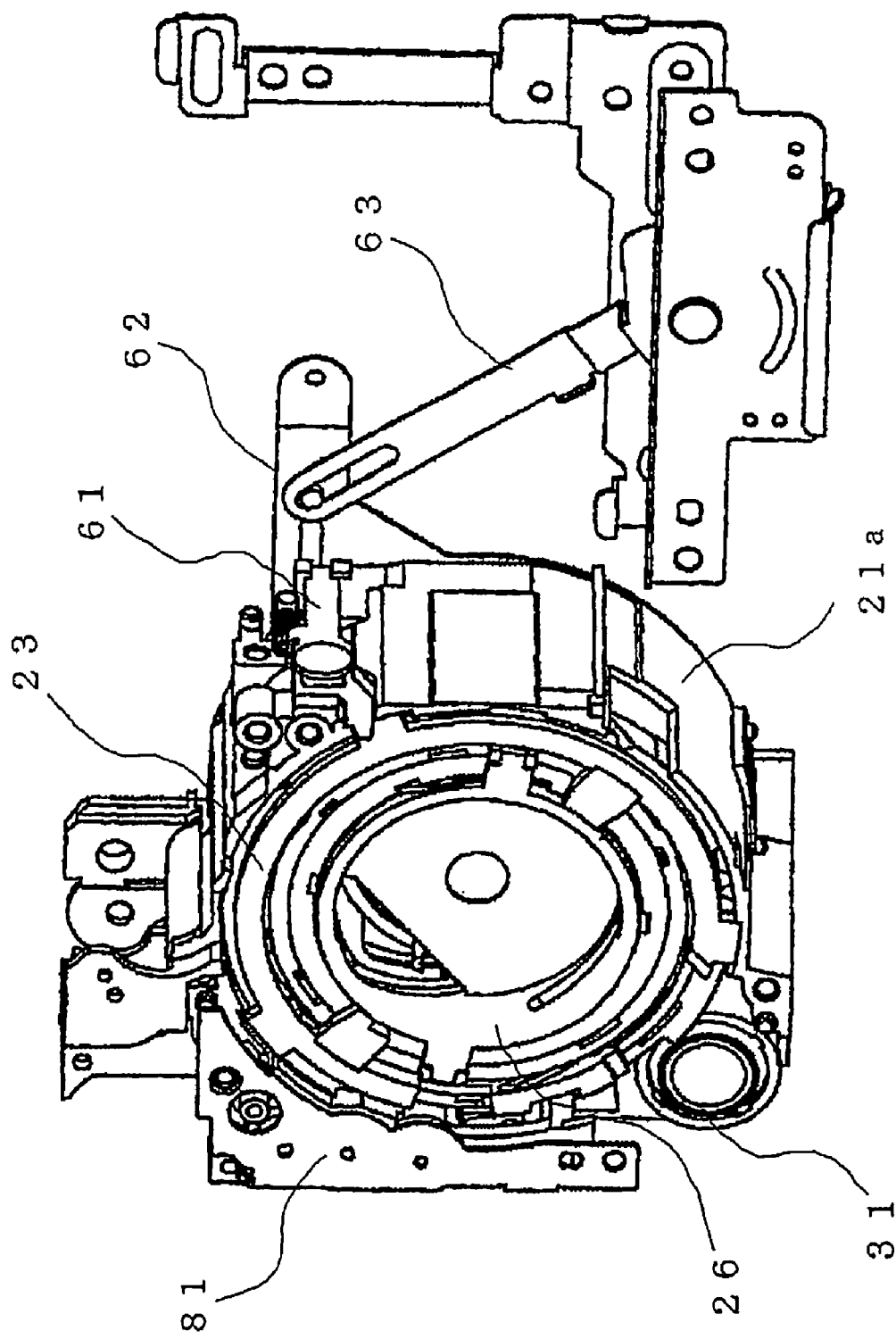
FIG. 4 is a schematic perspective view illustrating the structure of the main part of the lens barrel illustrated in FIG. 3, as viewed from the imaging plane.

Here, a lens barrier 62 for protecting the lens barrel according to the present preferred embodiment is described as follows. The lens barrier 62 illustrated in FIG. 3 to FIG. 5 is disposed to cover a side of the first lens group 11 facing the object, in the stored state, and protects the lens group from contaminations or damages. The lens barrier 62 is moved in back and forth directions transverse to the optical axis X by a barrier drive system 63. FIGS. 3 and 4 show a state in which the lens barrier 62 is closed, and FIG. 5 shows a state in which the lens barrier 62 is almost opened. The barrier drive system 63 drives the lens barrier 62 between the closed position (FIGS. 3 and 4) and the opened position (a position farther from the optical axis X than the position illustrated in FIG. 5) through the operation of a barrier-operating element (see a barrier-operating element 301 in FIG. 23A). The barrier drive system 63 has a function to bias the lens barrier 62 in a closing direction at the closed position and in an opening direction at the opened position.

Therefore, when driving the lens barrier 62 in the closed state toward the opening direction, the lens barrier 62 is moved to the opened state semi-automatically when the lens barrier 62 passes a predetermined position. Also, when an attempt is made to close the lens barrier 62 from the opened state, the lens barrier 62 is moved to the closed state semi-automatically when the lens barrier 62 passes a predetermined position. The position in the closed state is not necessarily required to be the same as the predetermined position in the opened state; rather, it is preferable that the lens barrier have a certain degree of hysteresis characteristics in the movement to accomplish a smooth operation of the lens barrier 62.

A barrier control member 61 is provided on a side of the fixed frame 21 (in the direction of opening the lens barrier 62) so as to be capable of sliding in a direction along the photographing optical axis X, and is biased toward the object by a spring or the like as needed. In the stored state, an engaging portion of the barrier control member 61 which is formed into a bent shape engages with base edge surfaces of the first rotary cylinder 22 and the first liner 23 and is biased toward the image surface against biasing force of the spring, and hence is not in contact with the lens barrier 62. In the used or photographing state, the lens barrier 62 is completely away from the respective lens groups and retaining frames thereof. In this state, engagement of the engaging portion of the barrier control member 61 is released, and hence the barrier control member 61 is biased toward the object by the biasing force, and then, a barrier-intercepting portion at the distal end enters into a passage of the lens barrier 62.

In this state, when the lens barrier 62 is rapidly operated to move the lens barrel to the collapsed position, there is a possibility that the lens barrier 62 hits against the lens barrel. However, since the barrier-intercepting portion at the distal end of the barrier control member 61 crosses the passage of the lens barrier 62, the lens barrier 62 is prevented from entering into a moving passage of the lens barrel. When the respective lens groups are stored and the stored state is completed, the base edge surfaces of the first rotary cylinder 22 and the first liner 23 engage with the engaging portion of the barrier control member 61, which is formed into the bent shape, to energize the engaging portion toward the image surface against the biasing force. Therefore, the lens barrier 62 can be moved to the front portion of the lens barrel, and hence the lens barrier 62 is correctly set to the closed position. In this manner, the interference between the lens barrier 62 and the lens cylinders retaining the lens groups can be effectively prevented.

In the preferred embodiment described above, the structure in which the third lens group 13 is retracted out the lens cylinder unit transverse to the optical axis X has been described, although it is not limited thereto. In this structure, the retracted third lens group 13 has the minimum outer diameter. When the third lens group 13 having the minimum outer diameter is retracted, a projective size of the lens barrel in which the third lens group 13 is retracted can be minimized efficiently, and thus the thickness of the lens barrel can be reduced.

Moreover, when the retracted lens is extended out of the fixed frame, a size of the device (lead screw and so on) for driving the retired lens group (i.e. the third lens group) is minimized by taking a structure such that the retracted lens is not away from the imaging plane possibly.

Furthermore, the lens retaining frame of the third lens group 13 or the third lens group 13 itself is larger than the lens retaining frames of the other lens groups 11, 12, 14 or the other lens groups 11, 12, 14 in length along the optical axis X, i.e., thickness. When the thickness of the third lens group 13 is larger than that of the other lens groups 11, 12, and 14, consequently, the thickness of the other lens groups decreases. Therefore, the thickness of the lens barrel is reduced when the lens barrel is in the collapsed position. As a result, the thickness of the lens barrel or a size in the direction of the optical axis X of the lens barrel is minimized.

In addition, because the retract lens group or the third lens group 13 is disposed behind and adjacent the shutter having the aperture stop function, the diameter of the lens barrel is less, and the retraction of the third lens group 13 is simplified without considering the interference of the shutter with the lens group unit and separating the position of the shutter from the lens cylinder unit, excessively.

Referring now to FIGS. 23A to 25, a second preferred embodiment of the invention, in which the lens barrel according to the present invention having the structure described in the above-described first preferred embodiment for example is employed as a photographing optical system to construct a camera, will be described. Although the second preferred embodiment describes the camera here, there has been appeared in the recent years a mobile information terminal such as so-called PDA (Personal Data Assistant), a mobile phone and so on, having a camera function or functional part installed therein.

Although the appearance is slightly different, many of such mobile information terminals have functions and structures substantially identical to the function and the structure of the camera. Therefore, an optical system device including the lens barrel according to the present invention may be employed in such mobile information terminals.

Figure 23A:
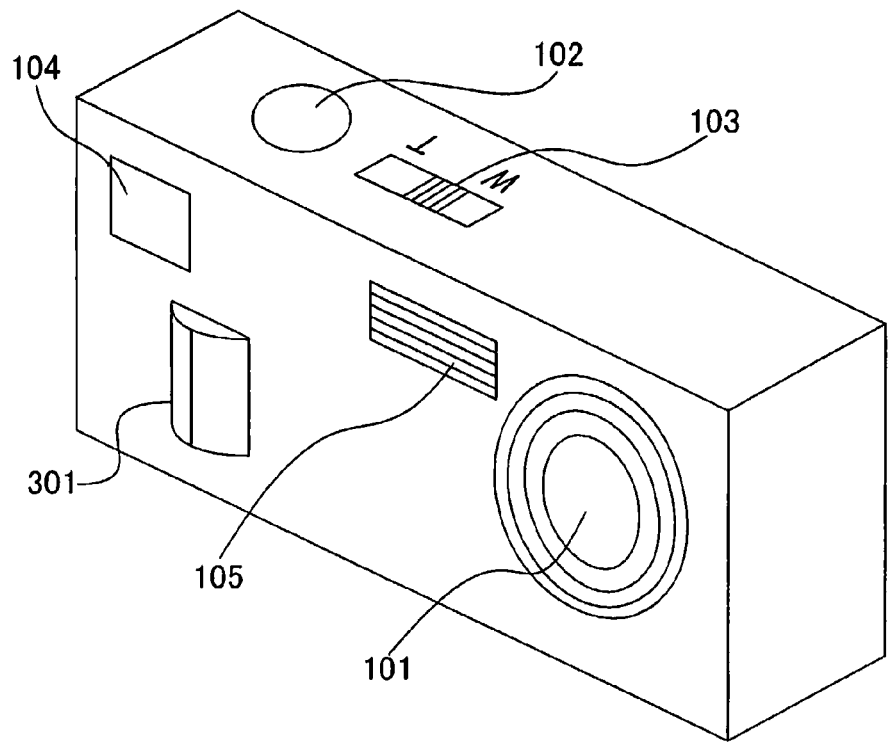
FIG. 23A is schematic perspective view illustrating an exterior appearance and a structure of a camera according to a second preferred embodiment of the invention as viewed from the object, in a state in which a photographing lens is collapsed in a body of the camera.
Figure 23B:
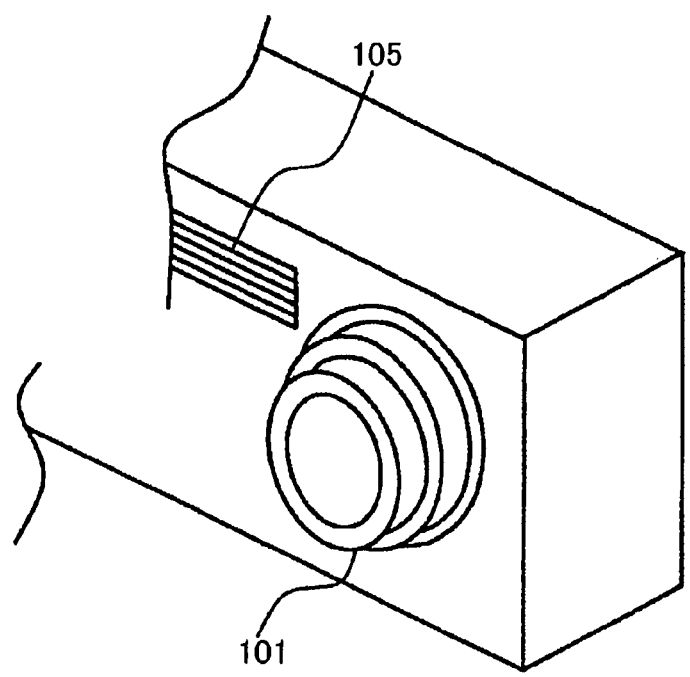
FIG. 23B is a schematic partial perspective view illustrating a state in which the photographing lens of the camera illustrated in FIG. 23A is projected or extended from the camera body.
Figure 24:
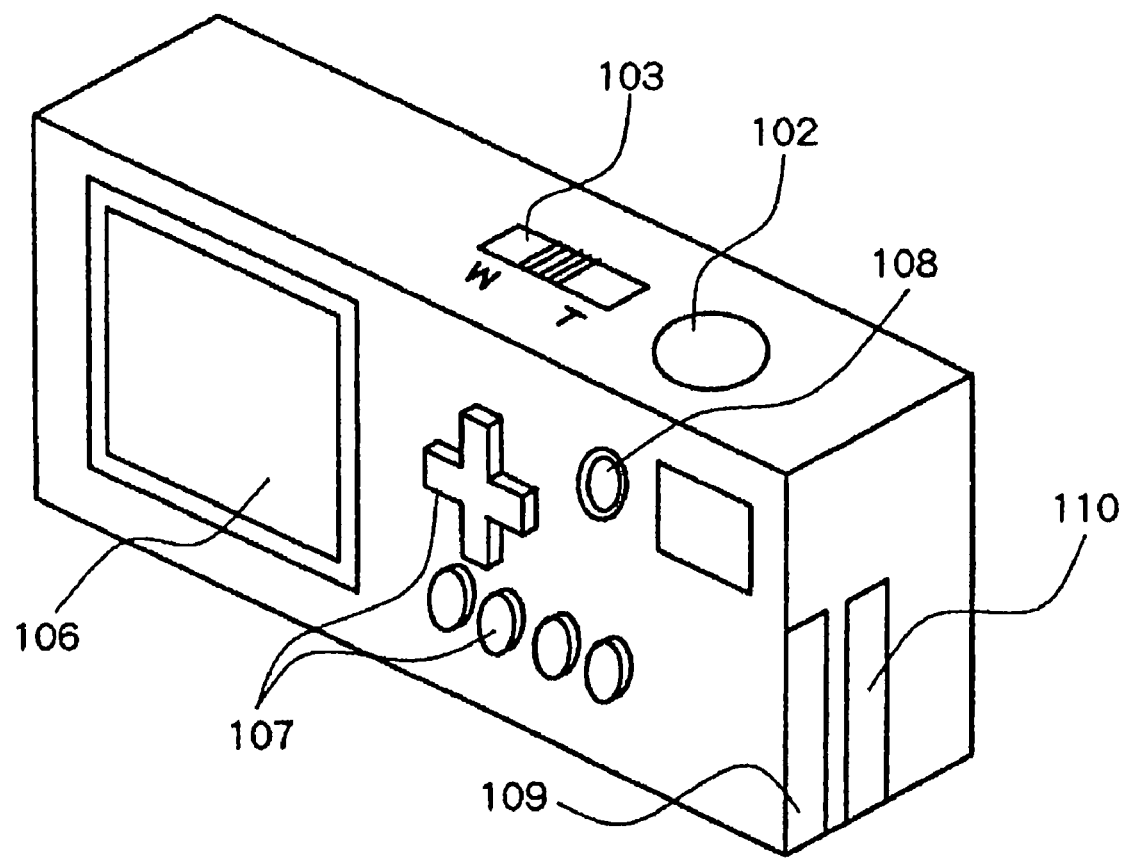
FIG. 24 is a perspective view schematically illustrating the exterior appearance and structure of the camera illustrated in FIG. 23A as viewed from a photographer side.

As illustrated in FIGS. 23A, 23B and 24, the camera includes an image pickup lens 101, a shutter release button 102, a zoom lever 103, a viewfinder 104, a strobe light 105, a liquid crystal display (LCD) 106, an operating button 107, a power switch 108, a memory card slot 109, an expansion card slot 110, the barrier-operating element 301 and so on.

Figure 25:
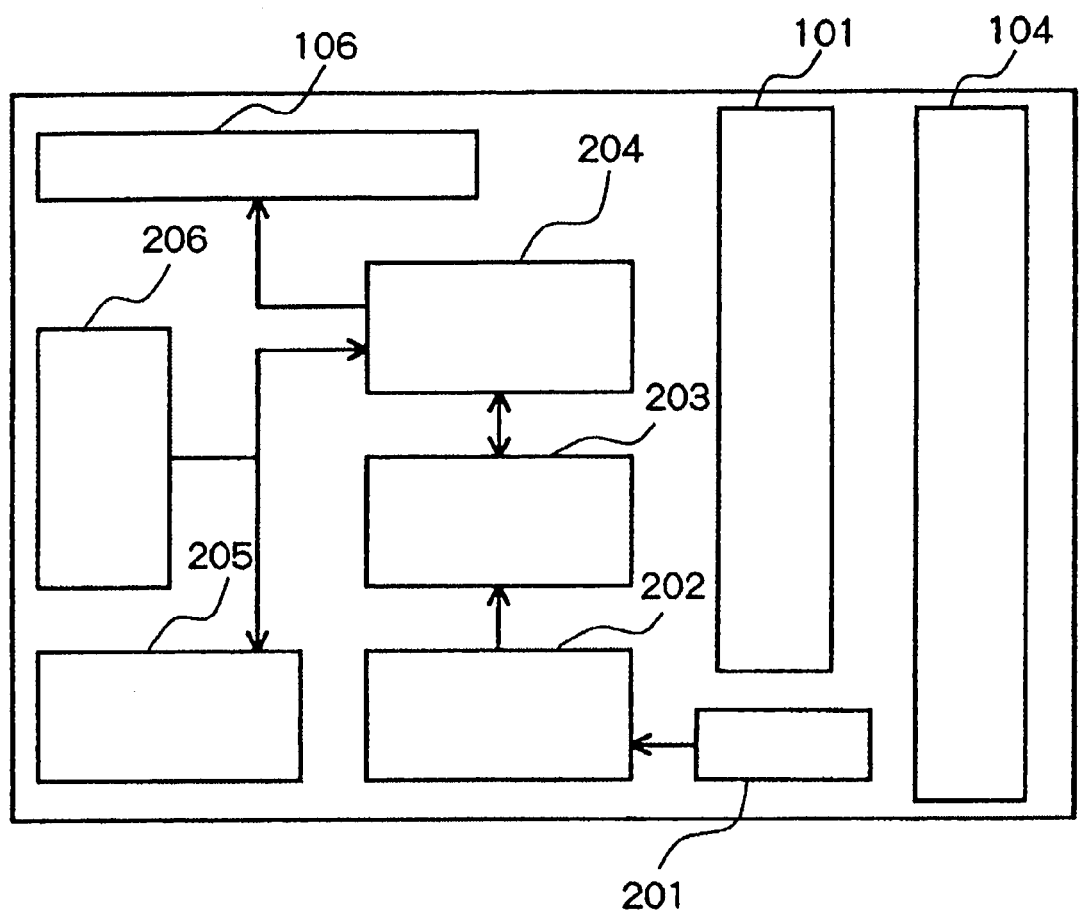
FIG. 25 is a block diagram schematically illustrating a functional structure of the camera illustrated in FIG. 23A.

Furthermore, as illustrated in FIG. 25, the camera also includes a photodetector 201, a signal-processing unit 202, an image-processing unit 203, a central processing unit (CPU) 204, a semiconductor memory 205, and an expansion card 206. Although it is not illustrated specifically, electric power is supplied from a battery as an electric source to the above-mentioned parts to operate the parts.

The photodetector 201 serves as an area sensor such as a CCD (Charge Coupled Device) image pickup element or the like to read an image of an object to be photographed, that is, of a photographing object, formed by the image pickup lens 101, which is a photographing optical system. As the image pickup lens 101, the optical system device including the lens barrel according to the present invention such as the lens barrel described in the above-described first preferred embodiment is employed. More specifically, the optical system device includes a plurality lens groups as optical elements and a telescopic cylinder unit retaining the lens groups, which structure the lens barrel. The lens barrel has a mechanism of retaining the respective lens groups in the lens cylinder such that the lens groups can be moved in response to the movement of the lens cylinder along the optical axis of the lens groups. The image pickup lens 101 to be integrated in the camera is generally integrated in the form of this optical system device.

An output from the photodetector 201 is processed by the signal-processing unit 202, which is controlled by the central processing unit 204, and is converted into digital image information. The image information digitized by the signal-processing unit 202 is objected to a predetermined image processing in the image-processing unit 203 which is also controlled by the central processing unit 204, and then stored in the semiconductor memory 205 such as a non-volatile memory. In this case, the semiconductor memory 205 may be a memory card inserted in the memory card slot 109, or may be a semiconductor memory integrated in a body of the camera. The liquid crystal display 106 may display the photographing image or may display the image stored in the semiconductor memory 205. An image stored in the semiconductor memory 205 is possible to be transmitted to the outside of the camera via the expansion card 206 inserted in the expansion card slot 110.

The image pickup lens 101 is embedded within the camera body into a collapsed or stored state as illustrated in FIG. 23A when the camera is being transported or carried by a user, and the lens barrier 62 is closed. When the user operates the barrier-operating element 301 to open the lens barrier 62, the power is turned on and the lens barrel is moved from the closed position to an opened position and projected from the camera body as illustrated in FIG. 23B, so that the photographing state is established. At this time, the image pickup lens 101 within the lens barrel is set so that the respective lens groups of the optical systems structuring a zoom lens are arranged, for example, at a short focal length wide angle position. When the zoom lever 103 is operated, the arrangement of the respective lens groups in the optical system is changed through the movement of the lens groups along the optical axis, and therefore, the zoom can be varied to the telephoto position.

It may be preferable that an optical system of the viewfinder 104 be configured such that the zooming is varied in association with the change of the angle of field of the image pickup lens 101. In many cases, focusing is achieved by half-pressing operation of the shutter release button 102. The focusing with the zoom lens in the lens barrel according to the present invention is achieved mainly by moving the fourth lens group 14, although it is not limited thereto. When the shutter release button 102 is further pressed to a completely pressed state, the photographing is achieved, and subsequently the processing as described above is performed.

In order to display the image stored in the semiconductor memory 205 on the liquid crystal display 106 or transmit the same to the outside of the camera via the expansion card 206, the operating button 107 is operated in a predetermined manner. The semiconductor memory 205 and the communication card 206 or the like are used by being inserted in a specific or multi-purpose slot such as the memory card slot 109 and the communication car slot 110.

When the image pickup lens 101 is in the stored state, the third lens group 13 is retracted from the optical axis X to the retracted position outside of the telescopic cylinder unit, and hence is stored in a line with the first lens group 11 and the second lens group 12 in a juxtaposed manner. Therefore, further reduction in thickness of the camera is achieved.

Generally, a viewfinder mechanism is disposed above the lens barrel for easier manipulation of the camera. Moreover, if the lens barrel includes a zoom changing magnification mechanism, because the viewfinder mechanism also needs the zoom changing magnification mechanism, it is preferable that a drive source (DC motor, pulse motor or the like) for conducting the zoom changing magnification operation and a transmission mechanism (gear connecting mechanism or the like) for transferring a driving force of the drive source to the lens groups be disposed adjacent the viewfinder mechanism.

For example, if the viewfinder mechanism is disposed in an upper-left position of the lens barrel, the drive source and the transmission mechanism may be disposed in an upper-right position of the lens barrel to use a limited space effectively. When the frame for the retractable lens group is to be retracted, the retaining frame may be stored below the lens barrel in consideration of the remaining space, i.e. at a lower-right position or a lower-left position of the lens barrel. In the present preferred embodiment, the space is disposed at the lower-right position of the lens barrel to store the retaining frame of the retracted lens group, and the drive source and the transmission mechanism for driving the lens groups are disposed at the lower-left position. As a result, miniaturization of a lens barrel is possible to accomplish with effective use of fourth corners, i.e. the upper-left position, the upper-right position, the lower-right position, and the lower-left position of a lens barrel.

Next, a third preferred embodiment of the present invention will be described with reference to FIGS. 26 to 28.

In the above-described first preferred embodiment, since the engagement between the cam grooves 21m, 21n and the cam followers 22a, 22b is released with respect to the cutout portion or the like for allowing the third frame 31 to move into and out from the optical path in the fixed cylinder 21a of the fixed frame 21, for the inclined parts, the plurality of cam grooves 21s as the sub-hericoid are formed between the cam grooves 21m and 21n as the main-hericoid, so as to engage with the cam followers 22s as the sub-hericoid. The cam followers 22s are appropriately disposed, for example, in the gear portion 22g, between the cam followers 22a and the cam followers 22b as the main-hericoid, at positions in proximity thereto and so on, of the first rotary cylinder 22, such that the first rotary cylinder 22 is supported with a plurality of supporting points. Thereby, the first rotary cylinder 22 is driven to advance and retire while the stable support of the first rotary cylinder 22 is maintained.

However, when the cutout portion for allowing the third frame 31 to move into and out from the optical path for example is large in size, it may be considered that the stable support of the first rotary cylinder 22 may not be compensated sufficiently by the cam grooves 21s as the sub-hericoid. Here, note that the inclined parts of the cam grooves 21m and 21n, and the cam grooves 21s provided on the inner peripheral surface of the fixed cylinder 21a are only used between the collapsed state in which the third frame 31 for example is positioned out of the optical path and the maximally extended position of the first rotary cylinder 22.

Therefore, in the present third preferred embodiment of the invention, when the cutout portion 21h of the fixed cylinder 21a is large in size, a cover plate 31x which obstructs or covers the cutout portion 21h in conjunction with the operation of passing the third frame 31 through the cutout portion 21h and moving at least a part of the third frame 31 substantially outside of the fixed cylinder 21a, is provided. Also, in inner surface of the cover plate 31x is formed to continue relative to the inner peripheral surface of the fixed cylinder 21a, and the inner surface of the cover plate 31x is arranged with cam grooves 31y which are provided to be continued relative to the cam grooves 21m and 21n and the cam grooves 21s provided on the inner peripheral surface of the fixed cylinder 21a.

Figure 27:
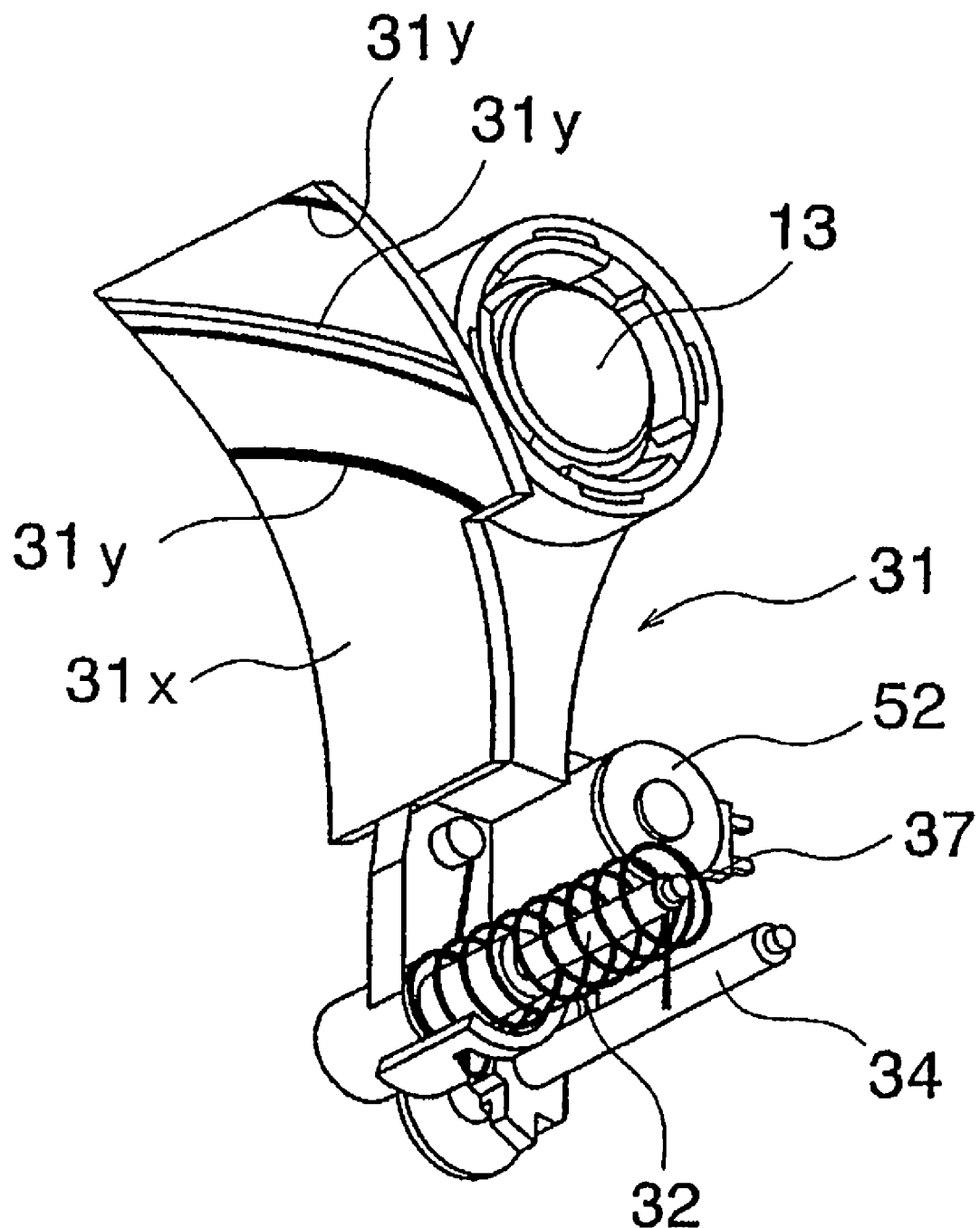
FIG. 27 is a perspective view schematically illustrating the third frame including the lid plate illustrated in FIG. 26 and a structure of its drive system.
Figure 28:
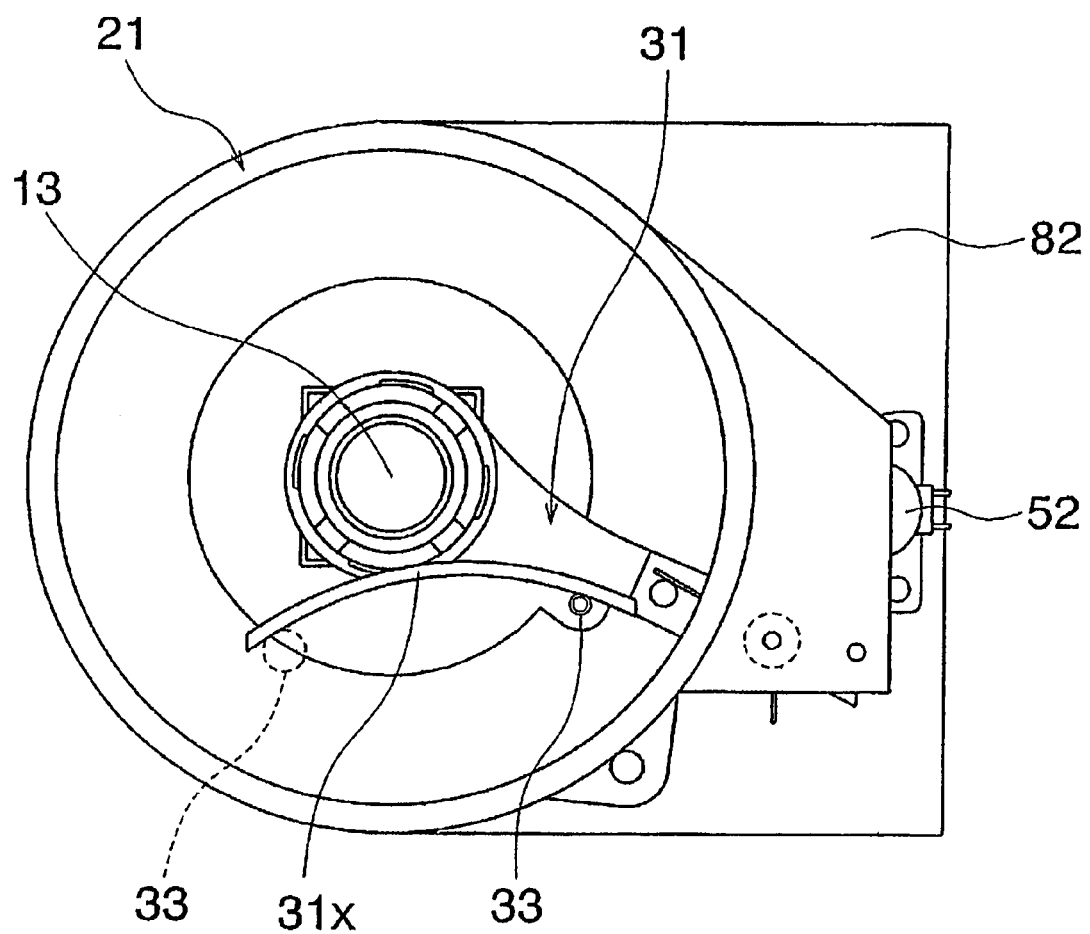
FIG. 28 is a schematic front view of the fixed frame and the structure of the third frame part for explaining operation of the third frame including the lid plate illustrated in FIG. 26, as viewed from the object.

More specifically, referring to FIGS. 26 to 28, in the present preferred embodiment, the cover plate 31x is provided to one side portion of the third frame 31 which retains the third lens group 13. The cover plate 31x is provided corresponding to the cutout portion 21h of the fixed cylinder 21a when the third frame 31 for example is retracted out of the optical path. The inner surface of the cover plate 31x is formed to be curved and continued relative to the inner circumferential surface of the fixed cylinder 21a in the retracted position.

Moreover, the inner surface of the cover plate 31x is formed with the cam grooves 31y which continue relative to, for example, the hericoidal cam grooves 21m, 21s passing the cutout portion 21h. Thereby, the first rotary cylinder 22 is extended stably and securely in a state in which the lid plate 31x is closed or covers the cutout portion 21h. After the first rotary cylinder 22 is extended, for example the third frame 31 is rotated to insert the third lens group 13 into the optical path. As illustrated in FIG. 28, a part of the cover plate 31x of the third frame 31 is brought to contact with the third frame sub-guide shaft 33 for example to dispose the third lens group 13 on the optical axis, and, as necessary, the third frame 31 is driven in the optical axis direction.

In the collapsing operation, when the third lens frame 31 for example is rotated and thereby the third lens group 13 passes through the cutout portion 21h of the fixed cylinder 21a to be retracted, the cover plate 31x blocks or covers the cutout portion 21h, and hence, the inner surface of the cover plate 31x becomes continuous relative to the inner circumferential surface of the fixed cylinder 21a. By this state, since the cam grooves 31y of the cover plate 31x continue relative to the hericoidal cam grooves 21m, 21s for example of the fixed cylinder 21a, the first rotary cylinder 22 is moved stably and securely and accommodated inside of the fixed cylinder 21a.

Although it has been described that the fourth lens group 14 is located in an image plane side of the second lens group 12 in the collapsed state, in one embodiment, the fourth lens group 14 may be structured to be retracted out of the optical path as similar to the third lens group 13 according to the above preferred embodiment. In such an embodiment, the fourth lens group 14 may be retracted to a section similar to the third lens group 13 and arranged along the optical axis direction. In a case in which the fourth lens group 14 is also retracted, it is desirable that the fourth lens group 14 be retracted in a slightly preceding manner and then the third lens group 13 be retracted, but the fourth lens group 14 and the third lens group 13 may also be driven interlockingly. Moreover, although it is desirable that the retracted section of the fourth lens group 14 be similar to the retracted position of the third lens group 13, the fourth lens group 14 may be retracted to a position different to the third lens group 13.

Although the present invention has been described in terms of exemplary embodiments, it is not limited thereto. It should be appreciated that variations may be made in the embodiments described by persons skilled in the art without departing from the scope of the present invention as defined by the following claims. The limitations in the claims are to be interpreted broadly based the language employed in the claims and not limited to examples described in the present description or during the prosecution of the application, which examples are to be construed as non-exclusive. For example, in the present disclosure, the term "preferably", "preferred" or the like is non-exclusive and means "preferably", but not limited to.

The present application is based on and claims priority from Japanese Patent Application Serial Number 2005-303744, filed Oct. 18, 2005, the disclosure of which is hereby incorporated by reference herein in its entirety.

INDUSTRIAL APPLICABILITY

The lens barrel according to the present invention is applicable to a camera and any portable device having a camera function or functional part installed therein, such as so-called PDA (Personal Data Assistant), a mobile phone, and so on, although it is not limited thereto.

The invention claimed is:
1. A lens barrel, in which at least one portion of a plurality of lens groups is collapsed to store the plurality of lens groups in a collapsed state and at least one portion of the plurality of lens groups is moved toward an object in a photographing state, the lens barrel comprising:
 a lens frame retaining at least one portion of the plurality of lens groups;
 a first lens cylinder supporting the lens frame inside thereof and including a plurality of cam followers on an outer circumferential section thereof; and
 a second lens cylinder including a mutually parallel plurality of cam grooves in an inner circumferential section thereof and storing the first lens cylinder therein in the collapsed state, the plurality of cam grooves being engaged with the plurality of cam followers and config- ured to advance and retire the first lens cylinder in a direction of an optical axis by a relative rotation of the first lens cylinder, wherein the plurality of cam grooves have two first cam grooves and two second cam grooves, the plurality of cam followers have two first cam followers and two second cam followers, the two first cam followers and the two second cam followers being engaged with the two first cam grooves and the two second cam grooves, respectively, and wherein the two first cam followers are disposed at positions different from each other circumferentially at substantially 180 degrees, the two second cam followers are disposed at positions different from each other circumferentially at substantially 180 degrees, the two first cam followers and the two second cam followers being circumferentially and alternately disposed at intervals close to even intervals, and the two first cam followers and the two second cam followers are spaced apart by a predetermined distance in the optical axis direction.

2. A lens barrel, in which at least one portion of a plurality of lens groups is collapsed to store the plurality of lens groups in a collapsed state and at least one portion of the plurality of lens groups is moved toward an object in a photographing state, the lens barrel comprising:

a lens frame retaining at least one portion of the plurality of lens groups;

a first lens cylinder supporting the lens frame inside thereof and including a plurality of cam followers on an outer circumferential section thereof; and a second lens cylinder including a mutually parallel plurality of cam grooves in an inner circumferential section thereof and storing the first lens cylinder therein in the collapsed state, the plurality of cam grooves being engaged with the plurality of cam followers and configured to advance and retire the first lens cylinder in a direction of an optical axis by a relative rotation of the first lens cylinder, wherein the plurality of cam grooves have two first cam grooves and two second cam grooves, the plurality of cam followers have two first cam followers and two second cam followers, the two first cam followers and the two second cam followers being engaged with the two first cam grooves and the two second cam grooves, respectively, and wherein each of the two first cam grooves is disposed to be biased and in parallel with corresponding one of the two second cam grooves, the two first cam grooves and the two second cam grooves are arranged at positions that are displaced from one another by a predetermined distance in the optical axis direction and displaced from one another by substantially 90 degrees with respect to the circumferential direction.

3. The lens barrel according to claim 1, wherein each of the two first cam grooves engaged with corresponding one of the two first cam followers, and corresponding one of the two second cam grooves engaged with corresponding one of the two second cam followers, intersect to each other.

4. The lens barrel according to claim 2, wherein each of the two first cam grooves engaged with corresponding one of the two first cam followers, and corresponding one of the two second cam grooves engaged with corresponding one of the two second cam followers, intersect to each other.

5. The lens barrel according to claim 1, wherein each of the two first cam grooves and the two second cam grooves has a cam-configuration including a configuration: inclined to move the first lens cylinder substantially linearly from a collapsed position to a maximally extended position of the first lens cylinder;

and extending in a circumferential direction of the second lens cylinder along a plane to which the optical axis crosses substantially vertically to allow only the rotation of the first lens cylinder and restrict the first lens cylinder to advance and retire in the direction of the optical axis at the maximally extended position in a maximally extended state to the photographing state, and wherein the first lens cylinder is configured to be moved to the maximally extended position before the lens frame supported by the first lens cylinder reaches to the photographing state from the collapsed state.

6. The lens barrel according to claim 2, wherein each of the two first cam grooves and the two second cam grooves has a cam-configuration including a configuration: inclined to move the first lens cylinder substantially linearly from a collapsed position to a maximally extended position of the first lens cylinder;

and extending in a circumferential direction of the second lens cylinder along a plane to which the optical axis crosses substantially vertically to allow only the rotation of the first lens cylinder and restrict the first lens cylinder to advance and retire in the direction of the optical axis at the maximally extended position in a maximally extended state to the photographing state, and wherein the first lens cylinder is configured to be moved to the maximally extended position before the lens frame supported by the first lens cylinder reaches to the photographing state from the collapsed state.

7. The lens barrel according to claim 5, wherein each of the two first cam followers and the two second cam followers comprises:

a pair of inclined sections inclined relative to the direction of the optical axis and faces mutually in parallel; and a pair of vertical surface sections forming the plane to which the optical axis crosses substantially vertically and faces mutually in parallel, wherein the inclined sections slidingly contact with cam surfaces of each of the two first cam grooves and each of the two second cam grooves in ranges of the cam surfaces in which the first lens cylinder is moved to the direction of the optical axis, respectively, and wherein the vertical surface sections slidingly contact with cam surfaces of each of the two first cam grooves and each of the two second cam grooves in ranges of the cam surfaces in which the first lens cylinder is rotated in the plane to which the optical axis crosses substantially vertically, respectively.

8. The lens barrel according to claim 6, wherein each of the two first cam followers and the two second cam followers comprises:

a pair of inclined sections inclined relative to the direction of the optical axis and faces mutually in parallel; and a pair of vertical surface sections forming the plane to which the optical axis crosses substantially vertically and faces mutually in parallel, wherein the inclined sections slidingly contact with cam surfaces of each of the two first cam grooves and each of the two second cam grooves in ranges of the cam surfaces in which the first lens cylinder is moved to the direction of the optical axis, respectively, and wherein the vertical surface sections slidingly contact with cam surfaces of each of the two first cam grooves and each of the two second cam grooves in ranges of the cam surfaces in which the first lens cylinder is rotated in the plane to which the optical axis crosses substantially vertically, respectively.

9. The lens barrel according to claim 5, wherein three sets or more of the cam grooves and the cam followers are provided, and wherein at least the three sets of the cam grooves and the cam followers are engaged mutually at least in a range in which the first lens cylinder is rotated in the plane to which the optical axis crosses substantially vertically without advancing or retiring along the optical axis.

10. The lens barrel according to claim 6, wherein three sets or more of the cam grooves and the cam followers are provided, and wherein at least the three sets of the cam grooves and the cam followers are engaged mutually at least in a range in which the first lens cylinder is rotated in the plane to which the optical axis crosses substantially vertically without advancing or retiring along the optical axis.

11. The lens barrel according to claim 5, wherein all of the cam followers of the first lens cylinder engage with all of the cam grooves of the second lens cylinder in a neighborhood of a boundary part between a range in which the first lens cylinder is driven in the direction of the optical axis and a range in which the first lens cylinder is rotated in the plane to which the optical axis crosses substantially vertically without advancing or retiring along the optical axis.

12. The lens barrel according to claim 6, wherein all of the cam followers of the first lens cylinder engage with all of the cam grooves of the second lens cylinder in a neighborhood of a boundary part between a range in which the first lens cylinder is driven in the direction of the optical axis and a range in which the first lens cylinder is rotated in the plane to which the optical axis crosses substantially vertically without advancing or retiring along the optical axis.

13. The lens barrel according to claim 1, wherein the second lens cylinder further comprises a cutout portion allowing at least one portion of a lens frame retaining other at least one portion of the plurality of lens groups to pass therethrough to locate the at least one portion of the lens frame retaining other at least one portion of the plurality of lens groups substantially outside of the second lens cylinder to establish the collapsed state,
wherein the first lens cylinder comprises other at least one cam follower provided separately to the plurality of cam followers,
wherein the second lens cylinder comprises other at least one cam grooves provided separately to the plurality of cam grooves and corresponding to said other at least one cam follower, and
wherein at least a part of said other at least one cam follower is configured to engage with at least a part of said other at least one cam grooves in a section of the second lens cylinder corresponding to the cutout portion.

14. The lens barrel according to claim 2, wherein the second lens cylinder further comprises a cutout portion allowing at least one portion of a lens frame retaining other at least one portion of the plurality of lens groups to pass therethrough to locate the at least one portion of the lens frame retaining other at least one portion of the plurality of lens groups substantially outside of the second lens cylinder to establish the collapsed state,
wherein the first lens cylinder comprises other at least one cam follower provided separately to the plurality of cam followers,
wherein the second lens cylinder comprises other at least one cam grooves provided separately to the plurality of cam grooves and corresponding to said other at least one cam follower, and
wherein at least a part of said other at least one cam follower is configured to engage with at least a part of said other at least one cam grooves in a section of the second lens cylinder corresponding to the cutout portion.

15. The lens barrel according to claim 1, further comprising:
a cutout portion provided in the second lens cylinder allowing at least one portion of a lens frame retaining other at least one portion of the plurality of lens groups to locate the at least one portion of the lens frame retaining other at least one portion of the plurality of lens groups substantially outside of the second lens cylinder to establish the collapsed state; and
a cover plate configured to obstruct the cutout portion of the second lens cylinder to provide a cylindrical surface which substantially continues relative to the inner circumferential section of the second lens cylinder when the first lens cylinder advances and retires along the optical axis,
wherein the cover plate includes at least one lid plate cam grooves continuing relative to at least one of the plurality of cam grooves passing the cutout portion corresponding to the plurality of cam followers, and
wherein the plurality of cam followers is configured to engage with at least a part of the at least one cover plate cam grooves in a section of the second lens cylinder corresponding to the cutout portion.

16. The lens barrel according to claim 2, further comprising:
a cutout portion provided in the second lens cylinder allowing at least one portion of a lens frame retaining other at least one portion of the plurality of lens groups to locate the at least one portion of the lens frame retaining other at least one portion of the plurality of lens groups substantially outside of the second lens cylinder to establish the collapsed state; and
a cover plate configured to obstruct the cutout portion of the second lens cylinder to provide a cylindrical surface which substantially continues relative to the inner circumferential section of the second lens cylinder when the first lens cylinder advances and retires along the optical axis,
wherein the cover plate includes at least one lid plate cam grooves continuing relative to at least one of the plurality of cam grooves passing the cutout portion corresponding to the plurality of cam followers, and
wherein the plurality of cam followers is configured to engage with at least a part of the at least one cover plate cam grooves in a section of the second lens cylinder corresponding to the cutout portion.

17. The lens barrel according to claim 13, wherein the lens frame, in which the at least one portion thereof is passed through the cutout portion and located substantially outside of the second lens cylinder, retains other at least one lens group in the plurality of lens groups.

18. The lens barrel according to claim 14, wherein the lens frame, in which the at least one portion thereof is passed through the cutout portion and located substantially outside of the second lens cylinder, retains other at least one lens group in the plurality of lens groups.

19. A lens barrel, in which at least one portion of a plurality of lens groups is collapsed to store the plurality of lens groups in a collapsed state and at least one portion of the plurality of lens groups is moved toward an object in a photographing state, the lens barrel comprising:
a lens frame retaining at least one portion of the plurality of lens groups;

a first lens cylinder supporting the lens frame inside thereof and including a plurality of cam followers and a gear portion on an outer circumferential section thereof;

a second lens cylinder including a mutually parallel plurality of cam grooves in an inner circumferential section thereof and storing the first lens cylinder therein in the collapsed state, and an opening provided corresponding to the gear portion, the plurality of cam grooves being engaged with the plurality of cam followers and configured to advance and retire the first lens cylinder in a direction of an optical axis by a relative rotation of the first lens cylinder;

a drive gear engaged with the gear portion of the first lens cylinder through the opening of the second lens cylinder to transmit a driving force to the first lens cylinder; and a drive source configured to drive and rotate the drive gear, wherein at least a part of the plurality of cam grooves of the second lens cylinder is provided to pass the opening, and wherein the drive gear includes a gear omitted portion in which a gear thereof is omitted corresponding to a pathway of the at least the part of the plurality of cam grooves passing the opening to avoid interference between the drive gear and the at least the part of the plurality of cam grooves passing the opening.

20. A camera, comprising the lens barrel according to claim 1 as an optical system for photographing.

21. A camera, comprising the lens barrel according to claim 2 as an optical system for photographing.

22. A camera, comprising the lens barrel according to claim 19 as an optical system for photographing.

23. A mobile information terminal, comprising a camera function part and an optical system using the lens barrel according to claim 1 as an optical system for photographing of the camera function part.

24. A mobile information terminal, comprising a camera function part and an optical system using the lens barrel according to claim 2 as an optical system for photographing of the camera function part.

25. A mobile information terminal, comprising a camera function part and an optical system using the lens barrel according to claim 19 as an optical system for photographing of the camera function part.

* * * * *